US008117019B2

(12) United States Patent
Sun et al.

(10) Patent No.: US 8,117,019 B2
(45) Date of Patent: Feb. 14, 2012

(54) METHOD FOR EVALUATING SEDIMENTARY BASIN PROPERTIES BY NUMERICAL MODELING OF SEDIMENTATION PROCESSES

(75) Inventors: Tao Sun, Missouri City, TX (US); Dachang Li, Katy, TX (US); Max Deffenbaugh, Houston, TX (US); Chun Huh, Austin, TX (US); David C Hoyal, Houston, TX (US); Neal Adair, Sugar Land, TX (US); Xiao-Hui Wu, Sugar Land, TX (US); Timothy A. Chartrand, Spring, TX (US); John C Van Wagoner, Houston, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 698 days.

(21) Appl. No.: 11/660,083

(22) PCT Filed: Aug. 23, 2005

(86) PCT No.: PCT/US2005/029884
§ 371 (c)(1),
(2), (4) Date: Feb. 12, 2007

(87) PCT Pub. No.: WO2006/036389
PCT Pub. Date: Apr. 6, 2006

(65) Prior Publication Data
US 2007/0219725 A1    Sep. 20, 2007

Related U.S. Application Data

(60) Provisional application No. 60/608,707, filed on Sep. 10, 2004.

(51) Int. Cl.
G06G 7/50 (2006.01)
G06F 17/10 (2006.01)
(52) U.S. Cl. .............................................. 703/9; 703/2
(58) Field of Classification Search .................. 702/1–6, 702/11–14, 16; 703/2, 5, 9; 367/73
See application file for complete search history.

(56) References Cited

U.S. PATENT DOCUMENTS
4,964,099 A    10/1990    Carron ........................... 367/73
(Continued)

FOREIGN PATENT DOCUMENTS
WO    WO2006/007466    1/2006

OTHER PUBLICATIONS

Pratson et al, "Debris Flows vs. Turbidity Currents: A Modeling Comparison of Their Dynamics and Deposits", 2000, AAPG Memoir 72 SEPM Special Publication 68, p. 57-72.*

(Continued)

*Primary Examiner* — Kamini S Shah
*Assistant Examiner* — Hung Havan
(74) *Attorney, Agent, or Firm* — ExxonMobil Upstream Research Company Law Department

(57) ABSTRACT

A method is disclosed for simulating the formation of sedimentary deposits. In one embodiment, this method involves, (a) solving a two-dimensional time-dependent map view system of equations for at least flow momentum, flow height, suspended sediment concentration, and entrainment of overlying water, (b) calculating net sediment deposition at each map view location using the flow properties, (c) recording the time-variability of the net sediment deposition.

27 Claims, 5 Drawing Sheets

U.S. PATENT DOCUMENTS

| | | | |
|---|---|---|---|
| 4,991,095 A | 2/1991 | Swanson | 364/421 |
| 5,081,612 A | 1/1992 | Scott et al. | 367/38 |
| 5,475,589 A | 12/1995 | Armitage | 364/421 |
| 5,671,136 A | 9/1997 | Willhoit, Jr. | 364/421 |
| 5,671,344 A | 9/1997 | Stark | 395/119 |
| 5,838,634 A | 11/1998 | Jones et al. | 367/73 |
| 5,844,799 A * | 12/1998 | Joseph et al. | 702/2 |
| 6,035,255 A | 3/2000 | Murphy et al. | 702/11 |
| 6,044,328 A | 3/2000 | Murphy et al. | 702/11 |
| 6,070,125 A | 5/2000 | Murphy et al. | 702/11 |
| 6,205,402 B1 | 3/2001 | Lazaar et al. | 702/2 |
| 6,246,963 B1 | 6/2001 | Cross et al. | 702/14 |
| 6,381,543 B1 | 4/2002 | Guerillot et al. | 702/13 |
| 6,480,790 B1 * | 11/2002 | Calvert et al. | 702/14 |
| 6,549,879 B1 | 4/2003 | Cullick et al. | 703/10 |
| 6,885,941 B2 | 4/2005 | Deffenbaugh et al. | 702/2 |
| 7,043,367 B2 | 5/2006 | Granjeon et al. | 702/2 |
| 7,433,784 B2 * | 10/2008 | Deffenbaugh et al. | 702/2 |

OTHER PUBLICATIONS

William Dietrich, "Settling Velocity of Natural Particles", 1982, Water Resources Research vol. 18, No. 6, pp. 1615-1626.*

Akiyama, J. et al. (1986) "Entrainment of Noncohesive Bed Sediment Into Suspension," 3$^{rd}$ Intn'l Symposium on River Sedimentation, The University of Mississippi, pp. 804-813.

Bagnold, R. A. (1954) "Experiments on a Gravity-Free Dispersion of Large Solid Spheres in a Newtonian Fluid Under Shear," *Proc. of Royal Soc. London*, A225, pp. 49-63.

Bagnold, R. A. (1966) "An Approach to the Sediment Transport Problem From General Physics," *U. S. Geol. Survey Prof. Paper*, 422-1, 37 pgs.

Beauboeuf, R. T. et al. (2000) "High Resolution Seismic/Sequence Stratigraphic Framework for the Evolution of Pleistocene Intra-Slope Basins, Western Gulf of Mexico: Depositional Models and Reservoir Analogs," Gulf Coast Section, *Society of Economic Paleontologists and Mineralogists*, 20$^{th}$ Annual Research Conference, Deep-Water Reservoirs of the World, Dec. 3-6, pp. 40-60.

Bitzer, K. (1999) "Two-Dimensional Simulation of Clastic and Carbonate Sedimentation, Consolidation, Subsidence, Fluid Flow, Heat Flow and Solute Transport During the Formation of Sedimentary Basins," *Computers & Geosciences*, v. 25, pp. 431-447.

Bowen, A. J. et al. (1984) "Modelling of Turbidity Currents on Navy Submarine Fan, California Continental Borderland," *Sedimentology*, v.31, pp. 169-185.

Bowman, S. A. et al. (1999) "Interpreting the Stratigraphy of the Baltimore Canyon Section, Offshore New Jersey with *Phil*, a Stratigraphic Simulator," in *Numerical Experiments in Stratigraphy: Recent Advances in Stratigraphic and Seimentologic Computer Simulations, SEPM Special Publications*, v.62, pp. 117-138.

Bradford, S. F. (1996) *Numerical Modeling of Turbidity Current Hydrodynamics and Sedimentation*, Ph. D. Thesis, University of Michigan, Ann Arbor, Michigan.

Bradford, S. F. et al. (1997) "Characteristic Analysis of Turbid Underflows," *J. Hydraulic Eng.*, v.123, pp. 420-431.

Bradford, S. F. et al. (1999) "Hydrodynamics of Turbid Underflows. I: Formulation and Numerical Analysis," *J. Hydraulic Eng.*, v.125(10), pp. 1006-1015.

Bradford, S. F. et al. (1999) "Hydrodynamics of Turbid Underflows. II: Aggradation, Avulsion, and Channelization," *J. Hydraulic Eng.*, v.125, pp. 1016-1028.

Bradford, S. F. et al. (2002) "Finite Volume Model for Shallow-Water Flooding of Arbitrary Topography," *J. Hydraulic Eng.*, v.128, pp. 289-298.

Dietrich, W. E. (1982) "Settling Velocity of Natural Particles," *Water Resources Research*, v. 18(6), pp. 1615-1626.

Eymard, R. et al. (2004) "Multi-Lithology Stratigraphic Model Under Maximum Erosion Rate Constraint," *International Journal for Numerical Methods in Engineering*, Wiley UK, v.60(2), pp. 527-548.

Fukushima, Y. et al. (1985) "Prediction of Iginitive Turbidity Currents in Scripps Submarine Canyon," *Marine Geology*, v.67, pp. 55-81.

Garcia, M. et al. (1991) "Entrainment of Bed Sediment Into Suspension," *Journal of Hydraulic Engineering*, v.117(4), pp. 414-435.

Granjeon, D. et al. (1999) "Concepts and Applications of a 3-D Multiple Lithology, Diffusive Model in Stratigraphic Modeling," in *Numerical Experiments in Stratigraphy: Recent Advances in Stratigraphic and Seimentologic Computer Simulations, SEPM Special Publication*, v.62, pp. 197-210.

Harlow, F. H. (1964) "The Particle-In-Cell Computing Method for Fluid Dynamics," in Alder, ed., *Computational Physics*, v.3, Academic Press, New York, pp. 319-343.

Harten, A. et al. (1983) "On Upstream Differencing and Godunov-Type Schemes for Hyperbolic Conservation Laws," *Soc. Indus. Appl. Math. Rev.*, v.25(1), pp. 35-61.

Imran, J. et al. (1998) "A Numerical Model of Channel Inception on Submarine Fans," *Journal of Geophysical Research*, v.103(C1), pp. 1219-1238.

Kaufman, P. et al. (1991) "Depth-Dependent Diffusion Algorithm for Simulation of Sedimentation in Shallow Marine Depositional Systems," in *Sedimentary Modeling: Computer Simulations and Methods for Improved Parameter Definition*, Ed. Franseen, E. K., Watney, W. L., Kendall, C. G. and Ross, W., *Kansas Geological Survey Bulletin*, v.233, pp. 489-508.

Komar, P. D. (1971) "Hydraulic Jumps in Turbidity Currents," *Geological Society of America Bulletin*, v.82, pp. 1477-1488.

Komar, P. D. (1973) "Continuity of Turbidity Current Flow and Systematic Variations in Deep-Sea Channel Morphology," *Geological Society of America Bulletin*, v.84, pp. 3329-3338.

Komar, P. D. (1977) "Computer Simulation of Turbidity Current Flow and the Study of Deep-Sea Channels and Fan Sedimentation," in Goldberg, E. D., McCave, I. N., O'Brien, J. J., and Steele, J. E., eds., *The Sea, Marine Modeling*, v.6, Chapter 15, New York, Wiley-Interscience, pp. 603-621.

Mackey, S. D. et al. (1995) "Three-Dimensional Model of Alluvial Stratigraphy: Theory and Application," *Journal of Sedimentary Research*, v.B65(1), pp. 7-31.

Mulder, T. et al. (1998) "Modeling of Erosion and Deposition by Turbidity Currents Generated at River Mouths," *Journal of Sedimentary Research*, v.68(1), pp. 124-137.

Pantin, H. M. (1979) "Interaction Between Velocity and Effective Density in Turbidity Flow: Phase-Plane Analysis, With Criteria for Autosuspension," *Marine Geology*, v.31, pp. 59-99.

Parker, G. et al. (1986) "Self-Accelerating Turbidity Currents," *J. Fluid Mech.*, v.171, pp. 145-181.

Patwardhan, V. S. et al. (1985) "Sedimentation and Liquid Fluidization of Solid Particles of Different Sizes and Densities," *Chemical Engineering Science*, v.40, pp. 1051-1060.

Piper, D. J. W. et al. (1993) "Processes of Late Quaternary Turbidity Current Flow and Deposition on the Var Deep-Sea Fan, North-West Mediterranean Sea," *Sedimentology*, v.40, pp. 557-582.

Regli, C. et al. (2004) "GEOSSAV: A Simulation Tool for Subsurface Applications," *Computers & Geosciences*, v. 30, pp. 221-238.

Ritchie, B. D. et al. (1999) "Three-Dimensional Numerical Modeling of Coarse-Grained Clastic Deposition in Sedimentary Basis," *Journal of Geophysical Research*, v.104(B8), pp. 17,759-17,780.

Ritchie, B. D. et al. (2004a) "Three-Dimensional Numerical Modeling of Deltaic Depositional Sequences 1: Influence of the Rate and Magnitude of Sea-Level Change," *J. Sedi. Res.*, v.74(2), pp. 203-220.

Ritchie, B. D. et al. (2004b) "Three-Dimensional Numerical Modeling of Deltaic Depositional Sequences 2: Influence of Local Controls," *J. Sedi. Res.*, v.74(2), pp. 221-238.

Roe, P. L. (1981) "Approximate Riemann Solvers, Parameter Vectors, and Difference Schemes," *Journal of Computational Physics*, v.43, pp. 357-372.

Syvitski, J. et al. (1999) "Stratigraphic Predictions of Continental Margins for the U.S. Navy," in *Numerical Experiments in Stratigraphy: Recent Advances in Stratigraphic and Seimentologic Computer Simulations, SEPM Special Publication*, v.62, pp. 219-236.

Syvitski, J. et al. (2001) "2D SEDFLUX 1.0C: An Advanced Process-Response Numerical Model for the Fill of Marine Sedimentary Basins," *Computers and Geosciences*, Pergamon Press, Oxford, GB, v.27(6), pp. 731-753, XP002296698, ISSN:0098-3004.

Tetzlaff, D. M. et al. (1989) *Simulating Clastic Sedimentation*, Van Nostrand Reinhold, New York, 202 pages.

Turner, J. S. (1973) *Buoyancy Effects in Fluids*, Cambridge University Press, pp. 127-164.

Van Wagoner, J. et al. (2003) *Energy Dissipation and the Fundamental Shape of Siliciclastic Sedimentary Bodies*, Search and Discovery Article #40080, 9 pgs.

Webb, E. K. (1994) "Simulating the Three-Dimensional Distribution of Sediment Units in Braided-Stream Deposits," *Journal of Sedimentary Research.*, v.B64(2), pp. 219-231.

EP Standard Search Report (2005) 3 pgs.

PCT International Search Report & Written Opinion (2006) 5 pgs.

Watham, D. et al. "Obstacle and Sinks: Effects of Turbidite Flow in Deepwater Continental Margins," GCSSEPM Foundation 21st Annual Research Conference: Petroleum Systems of Deepwater Basins, pp. 511-522, Dec. 2001.

\* cited by examiner

METHOD FOR EVALUATING SEDIMENTARY BASIN PROPERTIES BY NUMERICAL MODELING OF SEDIMENTATION PROCESSES

CROSS RELATED APPLICATIONS

This application is the National Stage of International Application No. PCT/US2005/29884 filed 23 Aug. 2005, which claims the benefit of U.S. Provisional Patent Application No. 60/608,707 filed on Sep. 10, 2004.

FIELD OF THE INVENTION

This invention relates generally to the field of geologic modeling and reservoir interpretation and characterization. Specifically, the invention is a method for constructing a three-dimensional model of the structure and grain-size distribution of sedimentary rocks that may compose a subsurface hydrocarbon reservoir.

BACKGROUND OF THE INVENTION

A geologic model is a digital representation of the detailed internal geometry and rock properties of a subsurface earth volume, such as a petroleum reservoir or a sediment-filled basin. In the oil and gas industry, geologic models provide geologic input to reservoir performance simulations which are used to select locations for new wells, estimate hydrocarbon reserves, and plan reservoir-development strategies. The spatial distribution of permeability is a key parameter in characterizing reservoir performance, and, together with other rock and fluid properties, determines the producibility of the reservoir. For sandstone reservoirs, the spatial distribution of permeability is a function of the grain-size distribution of sands which compose the reservoir, the compartmentalization of those sands by barriers of finer grained material, and the mineralogy and burial history of the reservoir.

Most geologic models built for petroleum applications are in the form of a three-dimensional array of model blocks (cells), to which geologic and/or geophysical properties such as lithology, porosity, acoustic impedance, permeability, and water saturation are assigned (such properties will be referred to collectively herein as "rock properties"). The entire set of model blocks represents the subsurface earth volume of interest. The goal of the geologic-modeling process is to assign rock properties to each model block in the geologic model.

The geologic modeling process can use many different data types, including but not limited to rock-property data obtained from cores, well logs, seismic data, well test and production data, and structural and stratigraphic surfaces that define distinct zones within the model. In general, the resolution or spatial coverage of the available data is not adequate to uniquely determine the rock properties in every geologic model cell. Other assumptions about the variability in these properties are made in order to populate all model cells with reasonable property values. Geocellular techniques, object-based modeling, and process modeling are three main ways to populate the discretized geologic volume with properties.

Geocellular models: In the geocellular approach, the relationship between properties in nearby cells is specified statistically. Geostatistical estimation methods (which may be either deterministic or probabilistic) are used to compute rock property values within cells. These methods take into account distance, direction, and spatial continuity of the rock property being modeled. Deterministic estimation methods commonly calculate a minimum-variance estimate of the rock property at each block. Probabilistic estimation methods develop distributions of the rock-property values and produce a suite of geologic model realizations for the rock property being modeled, with each realization theoretically being equally probable. The spatial continuity of a rock property may be captured by a variogram, a well-known technique for quantifying the variability of a rock property as a function of separation distance and direction. U.S. Pat. Nos. 5,838,634, 6,381,543 and 6,480,790 cover geocellular modeling methods embodied in processing flows which include repetitive optimization steps to drive the geologic model toward conformance with geologic and geophysical data types such as wells, seismic surveys and subsurface fluid production and pressure data. Most commercial modeling software packages, including PETREL, GOCAD and STRATAMODEL, contain a wide spectrum of geostatistical tools designed to fulfill the requirements of reservoir geologists and engineers. While these methods can readily accommodate data control points such as wells and geophysical constraints such as seismic data, they generally do not closely replicate the geologic structures observed in natural systems.

Object-based models: In the object-based approach, subsurface reservoir volumes are treated as assemblages of geologic objects with pre-defined forms such as channels and depositional lobes. U.S. Pat. No. 6,044,328 discloses one object-based modeling scheme that allows geologists and reservoir engineers to select geologic objects from an analog library to best match the reservoir being modeled. The appropriateness of the analog is judged by the operator of the process based on their geologic experience. Most commercial software packages including PETREL, IRAP-RMS and GOCAD implement objects as volumetric elements that mimic channels and lobes using simplified elements based on user deformable shapes such as half pipes and ellipses. Other examples of object-based models are the model of Mackey and Bridge (1995) and the model of Webb (1994). In their models, the depositional objects, such as a river belt in the model of Mackey and Bridge (1995) and the braided stream network in the model of Webb (1994), are placed sequentially on top of each other according to some algorithms. While these models try to mimic the real depositional structures, they do not attempt to capture the physics of water flow and sediment transport that, over geologic time, determined the rock properties at a particular subsurface location.

Process Models: Process-based models attempt to reproduce subsurface stratigraphy by building sedimentary deposits in chronological order relying to varying degrees on a model or approximation of the physical processes shaping the geology. While process-based models could potentially provide the most accurate representation of geologic structures, their application is complicated by the difficulty in matching their results to data control points or seismic images. Application of process models to predicting rock properties generally involves checking the model against subsurface data and then rerunning the model with new control variables in an iterative process. Although process models are rarely used in current industrial practice, U.S. Pat. Nos. 5,844,799, 6,205, 402 and 6,246,963 describe three such methods. These methods employ diffusion or rule-based process models to create basin-scale models with limited spatial detail inadequate for reservoir performance simulation.

A number of academic publications exist on process-based modeling of stratigraphy, particularly in shallow water environments. Most of these methods are not derived from the physics of the depositing fluid flow and sediment transport. Rather, transport of sediments is approximated by a diffusion-like equation. Examples of models in this class include the model of Bowman and Vail (1999), which is a two-dimensional algorithmic model based on a set of empirical rules for a shallow water environment, the model of Granjeon and Joseph (1999) which is a three-dimensional model for simulation of stratigraphy in shallow water environments, the model of Kaufman et al. (1991) which has been used in their simulation of sedimentation in shallow marine depositional systems, and the model of Ritchie et al. (1999, 2004ab) which was used in their work on three-dimensional numerical modeling of deltaic depositional sequences.

Different from the models described above, the SEDSIM model of Tetzlaff and Harbaugh (1989) simulates clastic sedimentation in the shallow water environment by solving two-dimensional depth-averaged flow equations using the Marker-in-cell [Harlow, 1964], or particle-in-cell method [Hockney and Eastwood, 1981]. Although SEDSIM was originally designed for the shallow water environment, it has also been applied to simulate a turbidity current by modifying the gravitational constant to take into account the relative density of the flow with respect to the surrounding medium [Tetzlaff and Harbaugh, 1989]. However, SEDSIM does not include the entrainment of water by turbidity currents and the resulting flow expansion and impact on sediment deposition. Since SEDSIM uses the Markering-Cell Method and the flow is represented by many flow elements with constant volume, to add the water entrainment relationship would involve significant modifications of SEDSIM.

The gridding scheme of SEDSIM imposes some limitations. The vertical dimension of each three-dimensional cell that contains sediment is fixed. In addition, each cell can only contain a specific single type (or size) of sediment and only the top-most cell can participate in the process of erosion.

Sediment transport and its effect on the flow are sometimes inaccurately modeled in SEDSIM. The reasons include not using experimentally-based erosion functions, and not allowing, the finer material within the flow to deposit until all the coarser material in excess of the transport capacity of the flow has been deposited. In addition, SEDSIM does not correct for depositional porosity in modeling of deposit elevation so the deposit elevation is underestimated. The effect of spatially and temporally varying sediment concentration on the gravitational driving forces is also not modeled.

Syvitski et al. (1999) published a process-based model for simulating the movement of sediments onto continental margins and their preservation in the stratigraphic record. There are many components in the model of Syvitski et al. (1999). They include (1) river mouth process, (2) buoyant river plumes and hyperpycnal flows, (3) turbidity currents, (4) currents and waves, and (5) debris flows generated from slope instabilities.

The mathematical model to describe the hyperpycnal flows and turbidity currents used by Syvitski et al. (1999) in their model is essentially an improved version of the standard Chezy's uniform flow model for a turbidity current [Mulder, T., J. Syvitski, and K. I. Skene, 1998; Bagnold 1954, 1966; Komar, 1971, 1973, 1977; Bowen et al. 1984; Piper and Savoye 1993]. In Chezy's uniform flow model, the sum of the gravitational driving force, the frictional resistance to flow, and the internal friction of the flow is assumed to be zero. By contrast, in Syvitski et al. (1999), the sum of the three forces is (more accurately) assumed to equal the acceleration of the current.

The hyperpycnal flow and turbidity current model used by Syvitski et al. (1999) is a large (basin) scale approximation of the flow. As such, it contains many assumptions that prevent accurate prediction of the finer-scale sedimentary structures that may control the performance of hydrocarbon reservoirs. For example, in their model, the convection of the flow momentum is not represented. The vast majority of sedimentary bodies that form oil and gas reservoirs are jet and leaf deposits [VanWagoner et al. 2003], at which scale the convection of flow momentum plays a crucial role in determining the dynamics of the flow and the nature of the bodies. Also, the slope of the interface between the turbid and clear water is approximated by the bed slope in their calculation of the gravitational driving forces. This prevents the model from capturing the backwater effect and hydraulic jumps in the flow, which are mechanisms in triggering avulsion and filling mini-basins [Beaubouef and Friedman, 2000]. Without these mechanisms, application of their model in simulating oil and gas reservoirs is limited since avulsion is one of the key processes responsible for reservoir heterogeneities.

The hyperpycnal flow and turbidity current model of Svyitski et al. (1999) is fundamentally one-dimensional and therefore cannot accurately represent lateral variability in rock properties or the physics of the three-dimensional flow that creates many characteristic features of deep water sediment stratigraphy as shown by Van Wagoner et al. (2003). Their model describes the confined flow of a turbidity current down a one-dimensional conduit. The widths of the conduit have to be specified before hand since there is no capability for modeling the initiation and evolution of channels and their associated channel deposits, which is another key element in oil and gas reservoirs. Finally, the Syvitski et al. (1999) model decouples the interaction between flow and deposit.

In their studies of self-accelerating turbidity currents, Parker et al. (1986) derived two sets of mathematic equations to describe the flow of turbidity currents in the deep-water environment. The first set of equations is called the "three-equation" model. The second set of equations is called the "four-equation" model. Both sets of equations are depth-averaged equations, and both consist of equations for the conservation of flow momentum, flow mass, and sediment. The "four-equation" model differs from the "three-equation" model in that it also explicitly takes the generation, dissipation, and transport of the turbulent kinetic energy into account. Neither model has been combined with the capability to record sedimentary information about the resulting deposit.

The mathematical formulation of Parker et al. (1986) was originally derived for one-dimensional flow with a single sediment grain-size. The "three-equation" model has later been extended to 2 dimension and multiple grain sizes by Bradford (1996, Ph.D. thesis), Bradford et al. (1997), Imran and Parker (1998) and Bradford and Katopodes (1999a,b).

Both Imran and Parker (1998) and Bradford and Katopodes (1999a,b) have applied the extended "three-equation" model of Parker et al. (1986) to study turbidity currents and incipient channelization in the deep water environment. In both studies, only the bathymetries of deposits in the earliest stages of development [Van Wagoner et al. 2003] have been reported. Imran and Parker (1998) discussed the inability of their model to simulate the longer-term evolution of the bathymetry of the deposits, saying "at some point, levee height would approach the thickness of the turbidity current itself. The present scheme would fail whenever levees grew to the point of nearly completely channelizing the flow, allowing for only small spillover of the turbidity current." Neither the work of Imran and Parker (1998) nor that of Bradford (1997) and Bradford and Katopodes (1999a,b) is related to the simulation of the three-dimensional stratigraphy of sedimentary deposits and their associated sedimentary bodies and rock properties as shall be described in this invention.

Accordingly, there is a need to modify both the "three-equation" model and the "four-equation" model for the turbidity currents of Parker et al. (1986) to simulate the long-term evolution of the sedimentary systems, and to simulate the formation of the three-dimensional stratigraphy for deep water deposits. In addition, there is a need for a method that honors the shapes and property distributions of naturally occurring sedimentary deposits based on geologic data such as seismic and well data. Such a method may be based on the fundamental laws of physics for water and sediment transport and incorporate features from process, object-based and geo-statistical approaches. Preferably, such a procedure should provide an automated option so that the optimization process can be performed by a computer, resulting in a more accurate model of the subsurface volume of interest, with negligible additional time and effort. The present invention satisfies this need.

SUMMARY OF THE INVENTION

A first embodiment of the present invention is a method for simulating the formation of sedimentary systems. This embodiment involves, (a) Solving a two-dimensional time-dependent map view system of equations for a deep-water turbidity current, including at least flow momentum, flow height, and suspended sediment concentration, and entrainment of overlying clear water; (b) Calculating net sediment deposition/erosion at each map view location using the flow properties; (c) Recording the net sediment deposition/erosion as it varies with time and spatial location. The repetition of this iterative process at each cell of the simulation for each time step produces a record of sediment deposition history which is a three-dimensional geologic model.

A second embodiment of the present invention is a method for simulating the formation of sedimentary systems. In this embodiment, (a) the initial topography of the bottom surface under the simulation region is determined, (b) the locations of the inlets of the flow that deposited the sediments are determined, (c) a grid is created dividing the region of simulation into cells, (d) the flow properties at the inlets are estimated, (e) the flow properties in each cell are updated, (f) the net sediment deposition/erosion in each cell is calculated, (g) the net sediment deposition/erosion for each cell is recorded, (h) steps e-g are repeated until a stopping criterion is achieved. Optionally, steps d-h can be repeated, adjusting the inlet flow properties until the simulated deposit is substantially similar in appearance to an observed sedimentary system, thus determining the correct inlet flow properties.

DETAILED DESCRIPTION

Figure 1:
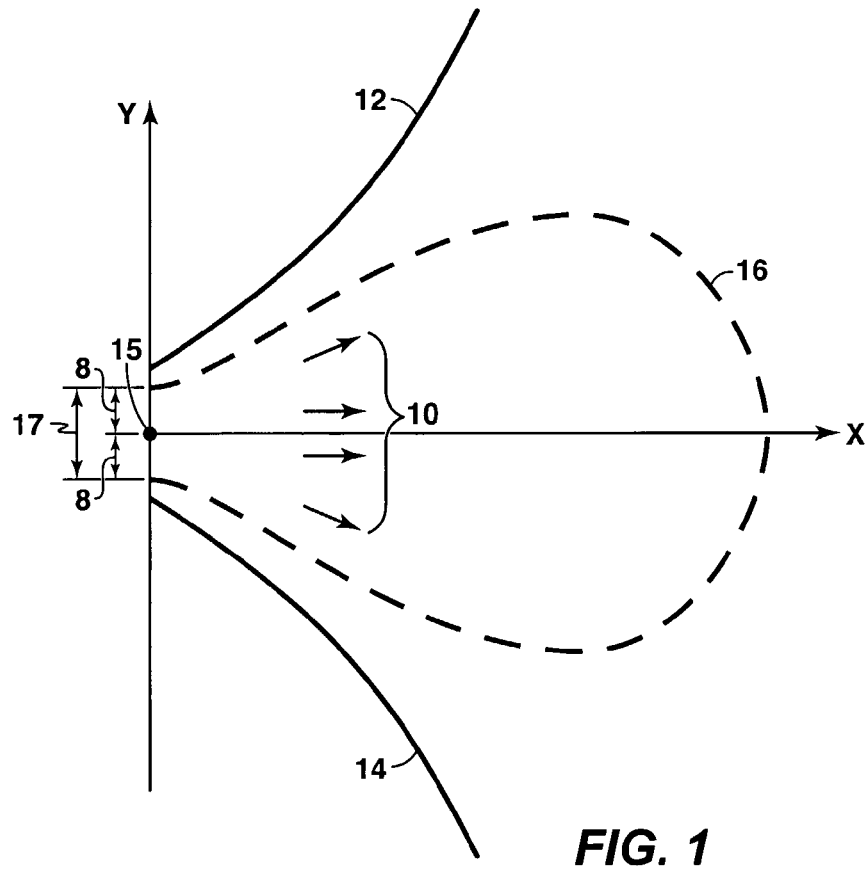
FIG. 1 is a plan view of a fluid flow which is depositing a sedimentary body, including the flow boundaries.

In the following detailed description, the invention will be described in connection with its preferred embodiment. However, to the extent that the following description is specific to a particular embodiment or a particular use of the invention, this is intended to be illustrative only. Accordingly, the invention is not limited to the specific embodiment described below, but rather, the invention includes all alternatives, modifications, and equivalents falling within the true scope of the appended claims.

The deposition of clastic sedimentary bodies typically begins with a flow of sediment-laden water from a confined channel, such as a river mouth or a submarine canyon mouth, into an open region, such as a basin. The point where the sediment-laden flow enters an open region where deposition occurs is known as the inlet. Initially such flows expand freely and deposit sediment as the flow decelerates. Thereafter, as the deposited sediment grows in height, the deposited sediment begins to obstruct the flow field. Eventually, the deposit becomes sufficiently large that the flow is diverted around the deposit. This results in a new path and inlet for the flow field to an open region beyond or adjacent to the old deposit. The deposition process then repeats, and a second body in the system is created. In addition, more than one such body may be actively built within the system at a time. Overall, the process produces a deposit consisting of stacks of sedimentary bodies, which is the structure of hydrocarbon reservoirs.

The inventive method enables a physics-based numerical simulation of the formation and evolution of three-dimensional sedimentary deposits, their structure and rock properties. Application of the method can also reduce uncertainties in reservoir interpretation and characterization by linking the stratigraphic patterns, sedimentary body geometries and rock properties seen in deposits with the associated depositional processes and the corresponding geologic controls in the deep-water environment.

The inventive method is based on the physical laws of fluid flow and sediment transport. It is capable of simulating the large scale and long term evolution of depositional systems, including the development of the associated sedimentary structures and rock properties, with high spatial resolution in three-dimensions. The method, depending on the embodiment, may involve (1) using a physics-based numerical simulation for the calculation of fluid flow and sediment transport in the deep water environment with given initial and boundary conditions; (2) coupling the fluid flow and sediment transport model with an appropriate erosion and deposition model to simulate the erosion and deposition of sediments of multiple sizes and properties everywhere in the system; (3) using an appropriate three-dimensional griding scheme to record the erosion and the deposition of sediment everywhere in the system, as well as the changing bathymetry of the system; (4) asserting external controls on the system by changing the boundary conditions dynamically. The combination of these features leads to a method for constructing a geologic model that specifies the grain-size distribution throughout a subsurface volume, guided by a seismic image of the subsurface volume. This method, in its various embodiments, is the subject of the present invention.

Figure 2:
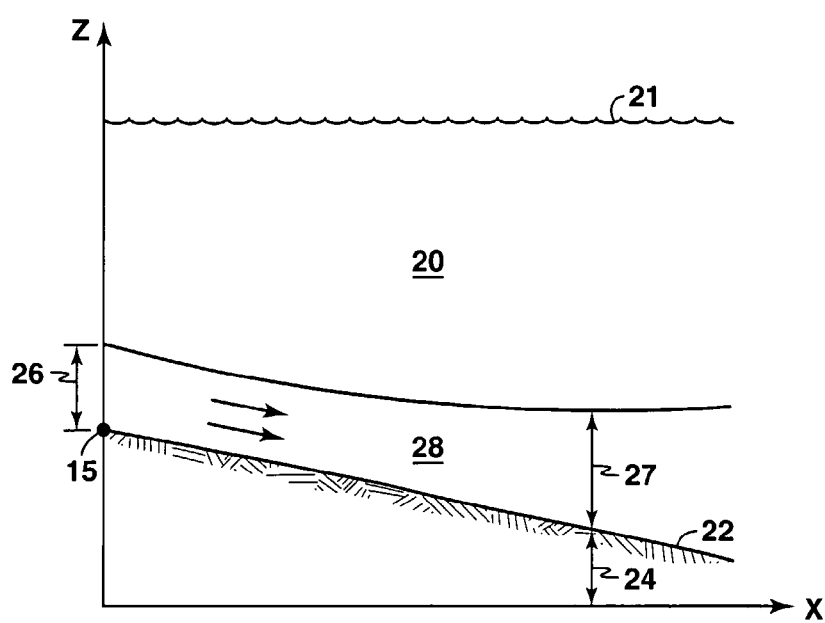
FIG. 2 is an elevation view corresponding to plan view FIG. 1.
Figure 3:
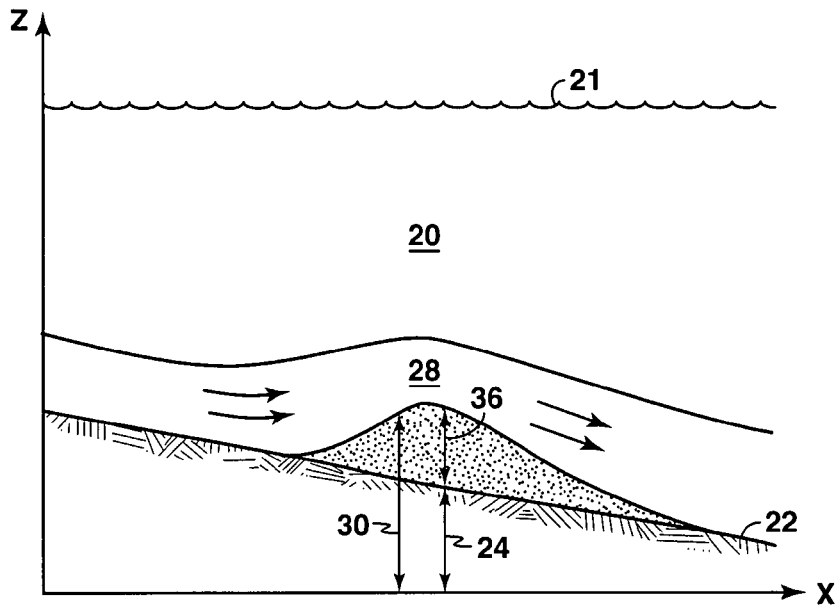
FIG. 3 is an elevation view corresponding to plan view FIG. 1 after deposition has occurred.
Figure 4:
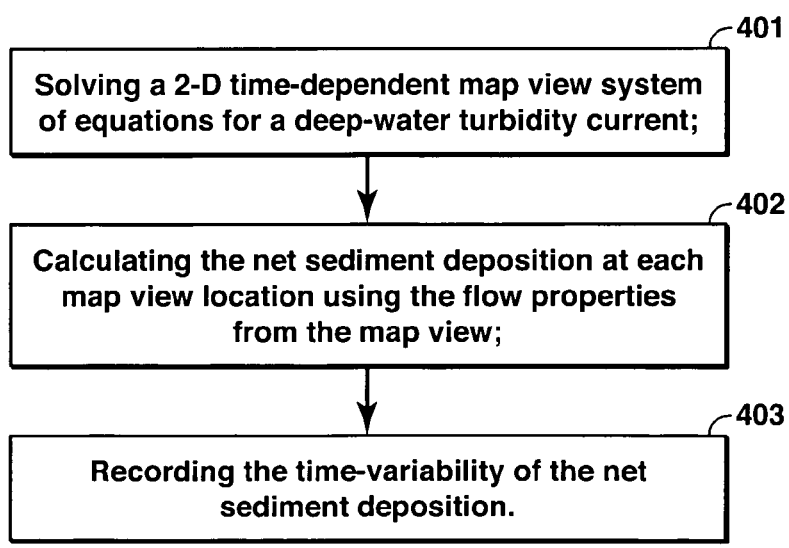
FIG. 4 is a flow chart of a first embodiment of the invention.
Figure 5:
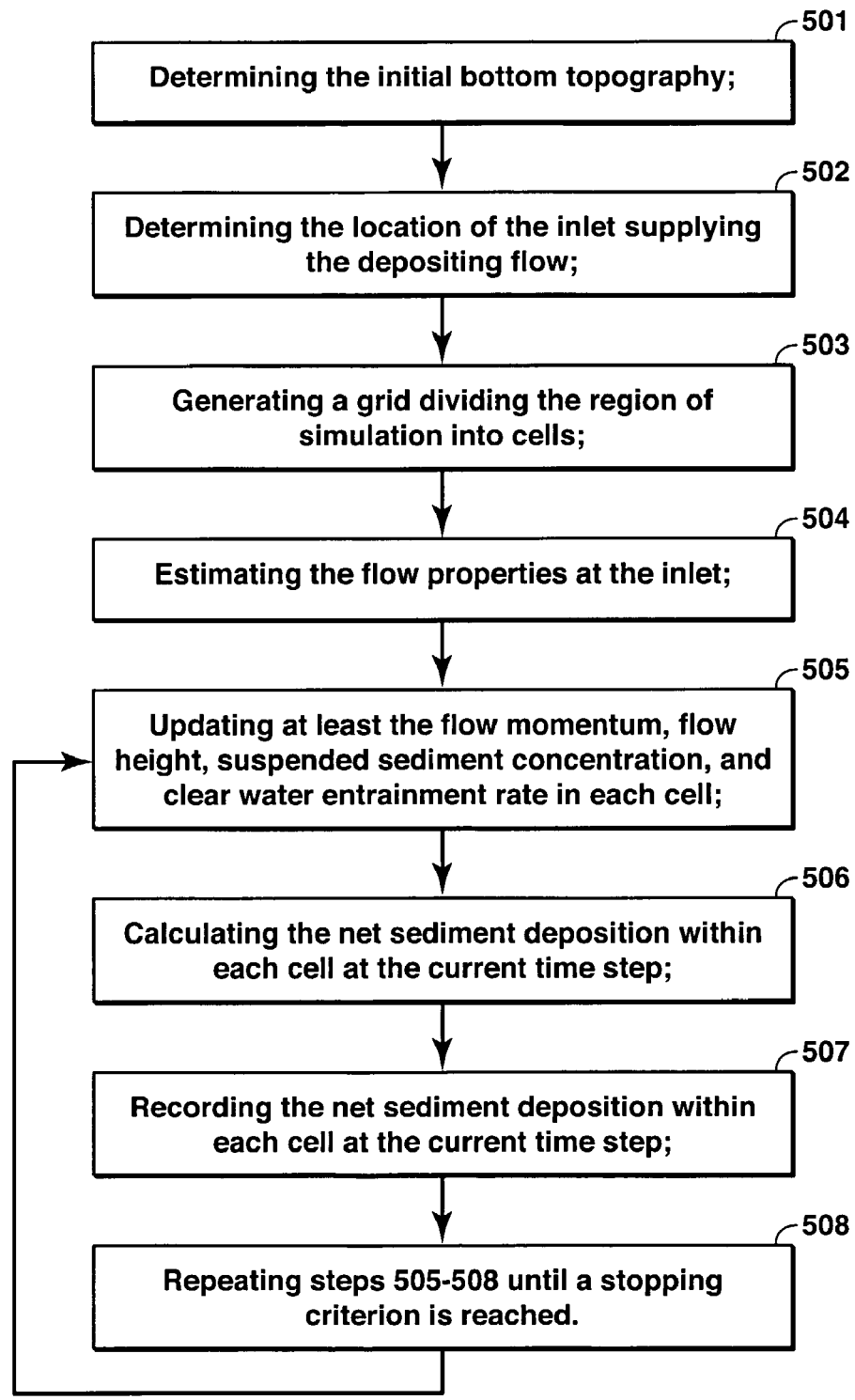
FIG. 5 is a flow chart of a second embodiment of the invention.

FIGS. 1, 2, and 3 depict the assumptions and parameters used in the present invention. FIGS. 4 and 5 are flow chart diagrams of two embodiments of the present invention. Table 1 provides a detailed list of the variables used in the present method with references to the figures, when applicable. The figures are described in greater detail below.

FIG. 1 depicts a plan view of fluid flow 10 with flow boundaries 12 and 14. Inlet 15 for fluid flow 10 is centered, for convenience, at the origin of the x and y-axes, and flow emitted from the inlet moves initially in the positive x direction. At the inlet 15, the flow boundary has an initial width 17 and a half-width 8, and expands in the positive x direction. Also depicted is an outline of the deposit 16 formed by the flow.

FIG. 2 depicts an elevation view corresponding to plan view FIG. 1 along the x-axis. The fluid inside the flow boundaries 12 and 14 of FIG. 1 is comprised of two layers. FIG. 2 illustrates the two layers of fluid as a clear layer 20 above a sediment-laden layer 28 and bounded by the sea surface 21 and sea floor 22. The sediment-laden layer 28 is also referred to herein as the turbid water layer. The elevation of the bottom before the deposition process occurs is 24. The height of the sediment-laden water layer at inlet 15 is 26. The height of the sediment-laden water layer 28 may vary based on location, as illustrated by height 27 located at a different point further along the x-axis in FIG. 2.

FIG. 3 is an elevation view corresponding to the plan view of FIG. 1 along the x-axis after deposition has occurred. As in FIG. 2, the fluid flow in FIG. 3 is depicted as being comprised of clear layer 20 above a sediment-laden layer 28. The elevation of the bottom after deposition is 30. This elevation consists of the elevation of the original bottom 24 together with the thickness of the newly deposited sediment layer 36.

FIG. 4 depicts a flow-chart diagram of one embodiment of the present invention and FIG. 5 depicts a flow-chart diagram of a second embodiment of the present invention.

Model Equations

In the model, the mathematical equations that govern the flow of the fluid and the transport of the sediments are depth-averaged time-dependent flow equations based on the previous work of Parker et al. (1986), Bradford (1996, Ph.D. thesis), Bradford et al. (1997), Imran and Parker (1998) and Bradford and Katopodes (1999a,b). However, the inventors have made some additions and changes to the model which enable the numerical simulation to better capture various features of the depositional process, such as avulsion and channelization, as well as to better match flume tank experiment results. The mathematical model used in the inventive method and specific details for numerical solution of its equations are described below.

(1) Momentum, Sediment, Fluid, and Turbulent Energy Balance Equations

An equation for the balance of the x component momentum is:

$$\frac{\partial u_x h}{\partial t} + \frac{\partial u_x^2 h}{\partial x} + \frac{\partial u_x u_y h}{\partial y} = -\frac{1}{2}\alpha_s Rg \frac{\partial C}{\partial x} h^2 - \alpha_s RgC\frac{\partial h}{\partial x}h - \quad [1]$$
$$RgC\frac{\partial \eta}{\partial x}h - c_d\sqrt{u_x^2 + u_y^2}\, u_x + \tau_x - u_x\delta_w\mathrm{sgn}(\delta_w - \varepsilon_w)$$

The equation for the balance of the y component momentum is:

$$\frac{\partial u_y h}{\partial t} + \frac{\partial u_x u_y h}{\partial x} + \frac{\partial u_y^2 h}{\partial y} = -\frac{1}{2}\alpha_s Rg \frac{\partial C}{\partial y} h^2 - \alpha_s RgC\frac{\partial h}{\partial y}h - \quad [2]$$
$$RgC\frac{\partial \eta}{\partial y}h - c_d\sqrt{u_x^2 + u_y^2}\, u_y + \tau_y - u_y\delta_w\mathrm{sgn}(\delta_w - \varepsilon_w)$$

An equation for the conservation of the turbid water layer:

$$\frac{\partial h}{\partial t} + \frac{\partial u_x h}{\partial x} + \frac{\partial u_y h}{\partial y} = \varepsilon_w - \delta_w + \tau_w \quad [3]$$

An equation for the conservation of the sediments with multiple grain-sizes in the flow is:

$$\frac{\partial hC_i}{\partial t} + \frac{\partial hu_x C_i}{\partial x} + \frac{\partial hu_y C_i}{\partial y} = E_i - D_{pi} + \tau_{ci} \text{ for } i = 1, 2, \ldots, n \quad [4]$$

Optionally, an additional equation describing the balance of turbulent kinetic energy can be included. Here the original one-dimensional single grain-size formulation of Parker (1986) has been extended to a two-dimensional multiple grain-size form. The modified formulation for K is:

$$\frac{\partial Kh}{\partial t} + \frac{\partial u_x Kh}{\partial x} + \frac{\partial u_y Kh}{\partial y} = u_*^2\sqrt{u_x^2+u_y^2} + \frac{1}{2}\left(\sqrt{u_x^2+u_y^2}\right)^3\varepsilon_w - \quad [5]$$
$$\beta_K K^{3/2} - \alpha_s Rgh\sum_{i=1}^{n} v_{si}C_i - \frac{1}{2}\alpha_s RgCh\sqrt{u_x^2+u_x^2}\,\varepsilon_w -$$
$$\frac{1}{2}\alpha_s Rgh\sum_{i=1}^{n} v_{si}(E_i - r_0 C_i) + \tau_K - K\delta_w\mathrm{sgn}(\delta_w - \varepsilon_w)$$

In the above equations, $u_x$ and $u_y$ are the x- and y-components of the depth-averaged flow velocity respectively, h is the depth of the turbid flow, $\eta$ is the bottom elevation, $C_i$ is the volumetric concentration of the sediments in the i th grain-size bin and $$C = \sum_{i=1}^{n} C_i$$

is the total sediment concentration. In equations [1] and [2], g is the gravitational constant, and R is the submerged specific weight for the sediments where $$R = \frac{\rho_s - \rho_w}{\rho_w}$$

and $\rho_s$ and $\rho_w$ are the sediment and water density, respectively. In equation [5], $u_*$ is the shear velocity, where $u_*^2 = \alpha_K K$, and $\alpha_K$ is a model parameter related to the turbulence. The remaining terms in equations [1]-[4] and [5] may be further described below, but are identified briefly here. In equations [1]-[2], $\alpha_s$ is the stratification parameter which characterizes the vertical variation of sediment concentration within the flow. In equation [5], $\beta_K$ is another parameter of the turbulence. In equations [1]-[2], $c_d$ is the friction coefficient producing a velocity-dependent drag on the flow. In equation [3], $\varepsilon_w$ is the entrainment function and $\delta_w$ is the detrainment function. The entrainment function characterizes the rate at which stationary clear water above is entrained into the moving turbid water below, becoming part of the flow. The detrainment function characterizes the reduction of the flow height due to the setting of the sediment from the top most part of the turbidity flow (Toniolio, 2002). In equation [4], $E_i$ and $D_{pi}$ are the erosion and deposition functions that characterize the rate of erosion of sediment in the i th grain-size bin from the bottom into the flow and the rate of deposition of sediment in the i th grain-size bin to the bottom from the flow, respectively. In equations [1], [2], and [4], $\tau_x$, $\tau_y$, $\tau_\omega$, $\tau_c$ and $\tau_K$ are optional terms describing the transport due to turbulent diffusion. The optional term sgn( ), which is shown in equations [1], [2], [3], and [5] is defined as sgn(a)=1 for a>0 and sgn(a)=0 for a≦0.

(2) The Stratification Coefficient $\alpha_s$

In one embodiment, the inventive method modifies the previous equations of Parker et al. (1986), Bradford (1996, Ph.D. thesis), Bradford et al. (1997), Imran and Parker (1998) and Bradford and Katopodes (1999a,b) by introducing a stratification parameter $\alpha_s$ in the momentum conservation equations of [1] and [2]. Sediment tends to be dominantly carried in the lower portion of turbidity flows, not distributed uniformly through the thickness of the flow as the earlier work had assumed. Assuming a stratification parameter value less than 1 accounts for the fact that the center of mass of the flow is generally below half the height of the flow.

When the stratification effect has been taken into account by using a value of $\alpha_s<1$, the component of the gravitational force associated with the gradients of both flow height and sediment concentration are reduced. As a result, the component of the gravitational force associated with the gradient of the bottom elevation becomes more significant. Therefore, the stratified flow will have stronger interactions with the underlying topography and bathymetry. The inventors discovered that without using this correction, it becomes difficult to accurately model flow avulsion and the model becomes more susceptible to numerical instabilities. When the effect of stratification has been taken into account, the model results match more closely the results from flume experiments.

The values of $\alpha_s$ to be used in simulations can be determined in a number of ways. An approximate value of $\alpha_s$ can be selected, typically ⅔. Alternately, the value of $\alpha_s$ can be adjusted by the user such that the overall flow and sediment transport properties and their associated overall sediment deposition (or erosion) patterns best match the available experimental or field data sets.

While a constant value of $\alpha_s$ may be used in the model, $\alpha_s$ can also be made to depend on other flow parameters such as the local Froude number Fr, as, for example, to use one value of $\alpha_s^{(1)}$ for $\alpha_s$ when the Froude number of the flow $F_r$ is <1 and the other value $\alpha_s^{(2)}$ for $\alpha_s$ when $F_r>1$. Both of these values can be user input parameters and can be adjusted to make the simulation correspond to observed data from the natural system.

Another method to determine values for $\alpha_s$ is based on a modification of the "top-hat" or "slab" assumption for the vertical sediment concentration profile [Turner (1973) and Pantin (1979)]. In Parker's original derivation [Parker, 1986], the following "top-hat" or "slab" assumption was used.

$$\varsigma_u(\eta) = \varsigma_c(\eta) = \varsigma_K(\eta) = \begin{cases} 1 \text{ for } 0 \leq \eta \leq 1 \\ 0 \text{ for } \eta > 1 \end{cases} \quad [6]$$

In above equation, $\varsigma_u(\eta)$, $\varsigma_c(\eta)$ and $\varsigma_K(\eta)$ are the vertical profiles for the flow velocity, sediment concentration and turbulent kinetic energy. In the same equation, $$\eta = \frac{z}{h}$$

is the rescaled (by flow depth h) dimensionless z-coordinate. Different from Parker's original model, we use:

$$\varsigma_u(\eta) = \varsigma_K(\eta) = \begin{cases} 1 \text{ for } 0 \leq \eta \leq 1 \\ 0 \text{ for } \eta > 1 \end{cases} \quad [7]$$

$$\varsigma_C(\eta) = \begin{cases} f_C(\eta) \text{ for } 0 \leq \eta \leq 1 \\ 0 \text{ for } \eta > 1 \end{cases}$$

where $f_C(\eta)$ is some normalized bottom-weighted function that captures nature of the sediment stratification. The normalization is, $$\int_0^1 f_c(\eta)d\eta=1. \quad [8]$$

The vertical profiles we proposed in equations [7] and [8] are consistent with the constraints set by the original derivation of the governing equations as shown in equations [1] to [4]. These constrains are, $$\int_0^\infty \varsigma_u d\eta=1$$

$$\int_0^\infty \varsigma_u \varsigma_K d\eta=1$$

$$\int_0^\infty \varsigma_u \varsigma_C d\eta=1$$

$$\int_0^\infty \varsigma_u^2 d\eta=1$$

In this method, $\alpha_s$ can then be calculated as, $$\alpha_s = 2\int_0^1 f_c(\varsigma)\varsigma d\varsigma \quad [9]$$

For non-stratified flow, $\alpha_s=1$.

The choice of $f_C(\varsigma)$ includes, but is not limited to, the following two examples:

$$(a) f_C(\varsigma)=(\gamma+1)(1-\varsigma)^\gamma \quad [10]$$

$$(b) f_C(\varsigma) = \frac{e^{-\varsigma_0/\varsigma}}{\varsigma_0(1-e^{-1/\varsigma_0})} \quad [11]$$

where in above equations, both $\gamma$ and $\varsigma_0$ are model parameters that can be used to adjust the degree of stratification. It will be shown below however, that neither the explicit form of $f_C(\varsigma)$, nor the specific choice of $\gamma$ and $\varsigma_0$ are utilized in the final form of our simulation models. They will be encapsulated into a single parameter $\alpha_s$, which we will term the geometric factor. By choosing appropriate values of $\alpha_s$, varying degrees of stratification effects can be modeled.

(3) Turbulence Parameters $\alpha_k$, $\beta_k$:

A difference between one preferred embodiment of the inventive method and Parker's original formulation lies in the treatment of the parameter $\beta_K$ in equation [5]. In Parker (1985), $\beta_K$ has been related to a characteristic friction coefficient $c_d^*$ based on the assumption that at steady state, the friction coefficient $c_d$ is the same everywhere and has a value equal to $c_d^*$. In our model however, we do not make the same assumption and consequently, $\beta_K$ is specified directly and is treated as a model parameter. The range of $\beta_K$ is generally between 0.0001 and 1 or even 0.005 and 0.5, with a typical value being 0.05.

The turbulence parameter $\alpha_K$ is supplied by the user. The range of $\alpha_K$ is generally between 0.001 and 1 or 0.0001 and 1, with a typical value being 0.01.

(4) The Friction Coefficient $c_d$.

The friction coefficient $c_d$ can be treated as a model input parameter. The most common range of $c_d$ in both experimental and field observations is from 0.001 to 0.1 or 0.002 to 0.05, with field experiments using lower values, typically 0.004, and lab experiments using higher values, typically 0.02. The friction coefficient can also be allowed to vary spatially, where the function $c_d(x, y, z)$ may be defined by the user or may be linked to local flow properties and the associated turbulence. For example, $c_d$ may be defined as a function of local Reynolds number. Alternatively, Parker (1986) has related $c_d$ to the local turbulent kinetic energy K and flow velocity via, $$c_d = \alpha_K \frac{K}{\sqrt{u_x^2 + u_y^2}} \quad [12]$$

where $\alpha_K$ is the turbulent parameter discussed previously. In order to use this last relationship, the creation, transport, and dissipation of turbulent kinetic energy must be modeled explicitly, as in equation [5].

(5) Entrainment and Detrainment

The entrainment function describes the entraining of clear water by the flowing turbid water. There are many different forms of the entrainment function. Any of them can be used in this model. The entrainment function used by Parker et al. (1986) is $$\varepsilon_w = \frac{0.00153}{0.0204 + R_i}, \quad [13]$$

where $R_i$ is the Richardson number and equals to the inverse of the square root of the well known Froude number $F_r$, namely $$R_i = \frac{1}{F_r^2}, \quad [14]$$

and $$F_r = \sqrt{\frac{u_x^2 + u_y^2}{RghC}}. \quad [15]$$

The same entrainment function has also been used in the current model.

Opposite to the entrainment of the clear water into the turbidity flow, settling of the sediment from the topmost part of the flow detrains clear water from the turbidity current and return it back to the surrounding environment. The concept of detrainment was first proposed by Toniolo et al. (2002). The original formulation is for a single grain-size and relates the rate of detrainment to the grain settling velocity $\delta_w = v_s$. The formulation we utilized is based on the original ideas of Toniolo et al. with extensions to make them applicable to turbidity currents carrying sediments of multiple grain-sizes, where we propose $$\delta_w = v_s(D^*), \quad [16]$$

and $D^*$ is the effective grain-size that characterizes the overall settling interface of the turbidity flow. The actual value of $D^*$ could range from the minimum grain-size to the geometric mean grain-size of the sediment present in the flow. An example of the choices for $D^*$ is $$D^* = D_{10} \quad [17]$$

where $D_{10}$ is the diameter of the 10th percentile in the distribution.

(6) Deposition Rate and Settling Velocity

The deposition rate is typically the deposition rate of sediment in still water.

$$D_i = r_0 C_i v_{si} \quad [18]$$

where $r_0$ is a model coefficient that relates the bulk sediment concentration to the near bed concentration, and $v_s$, is the settling velocity of the sediments in grain-size bin i.

The settling velocity $v_s(D)$ for a sediment grain with diameter D can be specified in a number of different ways. Four methods are described below as examples.

The first method is to use the Dietrich's settling velocity curve [Dietrich (1982)] for $v_s(D)$. In addition to the grain-diameter D, Dietrich has also provided corrections of $v_s(D)$ for the geometric and material properties of the grain, such as the aspect ratio of the grain, the surface roughness of the grain and the flatness of the grain. Although Dietrich's relationship assumes no interactions among the particles in suspension, it is a good approximation for sediment in most natural turbidity currents where the concentrations are typically low.

The second method is to base the value of $v_s(D)$ mostly on Dietrich's settling velocity curve $v_s^{[Dietrich]}(D)$, but apply corrections to the settling velocities of the finest material in order to take flocculation into account. One of the simplest method to take the effect of flocculation into account is to modify the settling velocity as follows:

$$v_s(D) = \begin{cases} v_s^{[Dietrich]}(D), & \text{if } D > D_{floc} \\ v_s^{[Dietrich]}(D_{floc}), & \text{if } D \leq D_{floc} \end{cases} \quad [19]$$

where $D_{floc}$ is the effective diameter of the settling floc.

The third method is to use Dietrich's settling velocity curve as the base, and apply corrections to take the effect of the hindered settling into account. Hindered settling occurs at high sediment concentrations where interactions among suspended particles produce settling velocities significantly different from those of free-settling particles. While most of the sedimentary rocks are believed to be deposited by flows with relatively low concentrations where the fall of the sediments from the flow to the underlying bed can be relatively closely approximated by free settling particles, an increasing body of evidence has shown that there are many sedimentary rocks deposited by high concentration flows in which the fall of the particles from the flow can only be described accurately by including the effect of the hindered settling. In one embodiment, the effect of the hindered settling can be taken into account by applying a hindering function, which corrects the particle settling velocity from that of the free settling fall velocity, $$v_s = v_s^{[Dietrich]} w_{hind}. \quad [20]$$

One example of such a hindering function is the polydisperse hindering function of Patwardhan and Tien (1985). The hindering function of Patwardhan and Tien (1985) is based on a one-dimensional fully turbulent sedimentation model. In that function, the hindering effects are a function of the sorting of the grain-size mixture as well as bulk concentration. In poorly sorted suspensions (SD>1 phi unit) hindering may occur at concentrations lower than 0.5%. In well-sorted suspensions (SD<1 phi unit) hindering is negligible at 5% and higher depending on the sorting.

The hindering function $w_{hind}$ of Patwardhan and Tien (1985) is, $$w_{hind} = \Phi \left[ 1 - \frac{1}{\left[ 1 + \frac{D_m[(1-\Phi)^{-1/3} - 1]}{D_i} \right]^3} \right]^{\theta_i - 2}. \quad [21]$$

In above equation, $\Phi$ is the total porosity in the flow, $D_m$ is the geometric mean grain-size suspended in the flow, $D_i$ is the grain-size of the sedimentary particles in the ith bin, and $\theta_i$ is a function of the particle Reynolds number $R_{pi}$ $$\theta_i = 4.35 R_{pi}^{-0.03} \quad 0.2 < R_{pi} < 1$$

$$\theta_i = 4.45 R_{pi}^{-0.1} \quad 1 < R_{pi} < 500 \quad [22]$$

The particle Reynolds number $R_{pi}$ for the grains in the i th size bin is defined as $$R_{pi} = \frac{(RgD_i)^{1/2} D_i}{v} \quad [23]$$

where $v$ is the kinematic viscosity of the water.

(7) Erosion Rate.

Examples of the erosion functions that can be used in this model are given here. The most commonly used erosion function is the Garcia-Parker erosion function [Garcia and Parker, 1991]. In this function, the rate of entrainment of sediment of grain-size bin i into the flow from the bed is $$E_i = \frac{a_z Z_i^5}{1 + \frac{a_z}{e_m} Z_i^5} v_{si} G_i \quad [24]$$

where $Z_i$ is a function defined as $$Z_i = \lambda \frac{u_*}{v_{si}} f(R_{pi}) \left( \frac{D_i}{D_{50}} \right)^{0.2} \quad [25]$$

in which $$f(R_{pi}) = \begin{cases} R_{pi}^{0.6} & \text{if } R_{pi} > 2.36 \\ 0.586 R_{pi}^{1.23} & \text{if } R_{pi} \leq 2.36 \end{cases} \quad [26]$$

and $$\lambda = 1 - 0.288\sigma. \quad [27]$$

In equation [24], $G_i$ is the volumetric percentage of the sediments of grain-size bin i in the surface layer, $\alpha_z$ is a constant and typically has a value of $1.3 \times 10^{-7}$, $e_m$ is the maximum value of the dimensionless erosion rate $$\frac{E_i}{v_{si} G_i}$$

and it sets the upper limit of the erosion function. In equation [25], $D_{50}$ is the diameter of the sediment grain in the 50th percentile in the distribution. In equation [27], $\sigma$ is the standard deviation of the grain-size distribution in the logarithmic "phi" units familiar to geologists.

An immediate variation of the erosion function is to calculate $Z_i$ as $$Z_i = \lambda \frac{u_*}{v_{si}} f(R_{pi}) \quad [28]$$

rather than using the function shown in equation [25] and to set $\lambda = 1$ instead of using equation [27]. This simplified erosion function is found to fit some of flume experiments better than the first erosion function.

A third example of an erosion function that could be used is from Akiyama and Fukushima (1985). In this erosion function, the rate of entrainment of sediment of grain-size bin i into the flow is:

$$E_i = \begin{cases} 0.3 v_{si} G_i, & Z_i > Z_m \\ 3 \times 10^{-12} Z^{10} \left( 1 - \frac{Z_c}{Z_i} \right) v_{si} G_i, & Z_c \leq Z_i \leq Z_m \\ 0, & Z_i < Z_c \end{cases} \quad [29]$$

where $Z_c = 5$ and $Z_m = 13.2$. This erosion function was used in the study of Parker et al. (1986).

(8) Turbulent Diffusion, $\tau_x, \tau_y, \tau_{ci}$.

The following terms are added to the right side of equations [1], [2] and [4] respectively to model the spreading effect caused by turbulent diffusion. Turbulent diffusion is the time averaged transport of mass and momentum by turbulent eddies. These three terms are defined as follows:

(a). The term for the turbulent diffusion of the x-component of momentum $$\tau_x = \frac{\partial}{\partial x}\left[ v_t \frac{\partial(u_x h)}{\partial x} \right] + \frac{\partial}{\partial y}\left[ v_t \frac{\partial(u_x h)}{\partial y} \right] \quad [30a]$$

(b). The term for the turbulent diffusion of the y-component of momentum $$\tau_y = \frac{\partial}{\partial x}\left[ v_t \frac{\partial(u_y h)}{\partial x} \right] + \frac{\partial}{\partial y}\left[ v_t \frac{\partial(u_y h)}{\partial y} \right] \quad [30b]$$

(c). The term for the turbulent diffusion of the sediment concentration for each grain-size bin i $$\tau_{ci} = \frac{\partial}{\partial x}\left[ v_t \frac{\partial(h c_i)}{\partial x} \right] + \frac{\partial}{\partial y}\left[ v_t \frac{\partial(h c_i)}{\partial y} \right] \quad [31a]$$

(d). The term for the turbulent diffusion of the water $$\tau_w = \frac{\partial}{\partial x}\left[ v_t \frac{\partial h}{\partial x} \right] + \frac{\partial}{\partial y}\left[ v_t \frac{\partial h}{\partial y} \right] \quad [31b]$$

(e). The term for the turbulent diffusion of the turbulent kinetic energy $$\tau_K = \frac{\partial}{\partial x}\left[v_t \frac{\partial kH}{\partial x}\right] + \frac{\partial}{\partial y}\left[v_t \frac{\partial Kh}{\partial y}\right] \qquad [32]$$

In the above terms, the turbulent diffusion coefficient $v_t$ can be related to the von Karman constant $\kappa$, shear velocity $u_*$ of the flow, an empirical correction factor, A, which ranges from 10 to 100, and is typically 30, and the flow depth h by the following equation, $$v_t = A\frac{\kappa}{6}u_* h. \qquad [33]$$

While the above three terms are not new for shallow-water equations, an embodiment of the inventive method is the first time that they have been applied to turbidity currents in association of the set of the governing equations as shown in equations [1-4].

Numerical Solution of the Model Equations (1) Gridding

To solve the equations numerically, the region of simulation is divided into cells. One gridding technique which is well suited for these simulations is described in International Patent Publication No. WO 2006/007466 titled "Method for geological modeling through hydrodynamics-based gridding (Hydro-Grids)." In Hydro-Grids, horizontal grid lines in the deposit model correspond to surfaces of constant time during the simulation. Vertical grid lines are also created based on rates of structural variability in available geologic data. The sedimentary properties of the deposit are then efficiently represented by these hydrodynamics-based grid cells.

(2) Solver

The numerical solution of the model equations is complicated because of numerical instabilities. The choice of solver appears to be used in avoiding these instabilities. The solver is a method to obtain numerical solutions for the partial differential equations in a discrete domain. Imran, et al. (1998) reported that their model crashes consistently at the beginning of flow avulsions. Bradford and Katopodes (1999) used Roe's solver [Roe, 1981] in their studies. However, none of their simulations have passed the stage of incipient avulsion. The inventors' own test of Roe's solver has shown similar numerical instabilities to those reported by Imran et al. (1998) developing as the simulation approaches the stage when avulsion would occur.

An innovative aspect of the preferred embodiment of the inventive method is using an HLL solver to solve equations [1] to [5]. Different from Roe's solver, the HLL solver obtains an approximate solution for the inter-cell numerical flux directly by assuming a particular wave configuration for the solution and calculating the wave speed [Harten et al., 1983]. Although the HLL solver has been used to solve shallow water equations before, it has never been used for the depth-averaged equations for turbidity currents as shown in equations [1] to [5]. The HLL solver has proven stable even when running long enough to generate highly complicated stratigraphy.

The solver steps the solution of the equations forward in time. At each time step, the flow properties in each cell are updated, the deposition rates are calculated, and the bottom is modified to reflect the deposition. The solver completes when some stopping condition is reached. Typically the stopping condition is the geologic time duration to be simulated. Alternatively, the stopping condition could be based on the deposited sediments reaching some thickness.

(3) Boundary Conditions

Boundary conditions which can be implemented in one embodiment of the inventive method include: standard open boundary conditions, wall boundary conditions, and dry nodes. In addition to cells which are defined to be dry as a boundary condition, some cells that were previously covered by flows (either turbidity currents in the deep-water model, or just water flow in the shallow water model) could emerge from the flow and become "dry" cells due to a variety of reasons, for example, upstream avulsion of the flow. Emerging "dry" nodes often represent sources of numerical instabilities and create inaccuracies in the calculation. The situation becomes especially severe in regions of high bed topography gradient.

The algorithm we propose to solve the problem associated with "dry" nodes is described below. Without loss of generality, assume two neighboring cells A and B whose bed elevation are $\eta_A$ and $\eta_B$ respectively. The flow height on top of these two cells are $h_A$ and $h_B$ respectively.

If $h_A > 0$ and $\eta_B + h_B < \eta_A$, the flux between the two cells is calculated using following algorithm:
(1) Calculate the flux $F_{AB}$ in Cell A at the edge that bonds Cell B by temporarily setting the flow depth $h_B$ in Cell B to zero.
(2) Calculate the flux $F_B$ in Cell B at the edge that bonds Cell A by temporarily setting $\eta_A$ to $\infty$.
(3) The out flux in Cell A at the edge that bonds Cell B is $F_{AB}$.
(4) The out flux in Cell B at the edge that bonds Cell A is then $F_B - F_{AB}$.

When $h_A = 0$ and $\eta_B + h_B < \eta_A$, the flux between the two cells is calculated using following algorithm:
(1) Calculate the flux $F_B$ in Cell B at the edge that bonds Cell A by temporarily setting $\eta_A$ to $\infty$.
(2) The out flux in Cells A and B is zero and $F_B$, respectively.

(4) Speed Enhancement by Reducing Number of Grain-Size Bins

In computer simulation, the continuous distribution of sediment grain-size is represented by a finite number of grain-size bins. Each bin has an associated nominal grain-diameter, typically the geometric mean of the upper and lower limits of the grain-size range contained in the bin. All sediment within the bin is assumed to erode and deposit like sediment having this nominal grain-diameter.

For computational speed, it is desirable to limit the number of grain-size bins. However, if the number of bins is too small, the sediment within a bin may be dominantly larger or smaller than the nominal diameter. In this case, the net deposition rate for the bin will be miscalculated, and the size and shape of the simulated deposit will be compromised.

This problem can be mitigated by dynamically adjusting the nominal grain-diameter for each bin so that the net deposition rate is correctly predicted. With this novel correction, the number of bins utilized for accurate simulation can be reduced. In one embodiment, the appropriate nominal grain-diameters for each bin are found assuming that a) the complete grain-size distribution in the flow is log-normal in grain-diameter and b) the net deposition rate within each bin is exponential in grain-diameter. Other methods for computing appropriate nominal grain-diameters based on interpolating the grain-size distribution and the net deposition rate within bins are also within the scope of this invention.

In this discussion, grain-diameter x will be given on the logarithmic phi scale familiar to sedimentologists. The log-normal grain-size distribution in the flow can then be written as, $$p(x) = \frac{1}{\sqrt{2\pi}\,\sigma} \exp\left[-\frac{(x-\mu)^2}{2\sigma^2}\right], \quad [35]$$

where p(x) is the differential volume fraction of grains having diameter x, $\mu$ is the mean grain-diameter on the phi scale, and $\sigma$ is the standard deviation of grain-diameter on the phi scale. The mean and standard deviation of this distribution at a given location and time step are determined by curve fitting to the fractions of the total grain volume within each size bin.

Within the ith grain-size bin, the net deposition y can be written as a linear function of the phi scale grain-diameter, $$y = a_i x + b_i, \quad [36]$$

where $a_i$ and $b_i$ are computed to match the net deposition rate for the largest and smallest grains included in the ith grain-size bin.

Using equation [35] and [36], the total net deposition $Y_i$ for the ith grain-size bin can be expressed as follows, $$Y_i = \frac{\int_{x_2}^{x_1}(a_i x + b_i)p(x)dx}{\int_{x_2}^{x_1} p(x)dx} = \left[\mu + \sqrt{\frac{2}{\pi}}\,\sigma\frac{\exp\left(-\frac{1}{2\sigma^2}(\mu-x_1)^2\right) - \exp\left(-\frac{1}{2\sigma^2}(\mu-x_2)^2\right)}{\mathrm{erf}\left(\frac{1}{\sqrt{2}\,\sigma}(\mu-x_1)\right) - \mathrm{erf}\left(\frac{1}{\sqrt{2}\,\sigma}(\mu-x_2)\right)}\right]a_i + b_i \quad [37]$$

From equation [37], the effective grain-size X (on the phi scale) which will produce the same net deposition as the continuous grain-size distribution, can be estimated using the following formula:

$$X = \mu + \sqrt{\frac{2}{\pi}}\,\sigma\frac{\exp\left(-\frac{1}{2\sigma^2}(\mu-x_1)^2\right) - \exp\left(-\frac{1}{2\sigma^2}(\mu-x_2)^2\right)}{\mathrm{erf}\left(\frac{1}{\sqrt{2}\,\sigma}(\mu-x_1)\right) - \mathrm{erf}\left(\frac{1}{\sqrt{2}\,\sigma}(\mu-x_2)\right)} \quad [38]$$

EMBODIMENTS

A first embodiment of the invention will now be described. With reference to FIG. 4, this embodiment is a method for simulating the formation of sedimentary systems. As illustrated in FIG. 4, this embodiment involves solving a two-dimensional time-dependent map view system of equations for the flow of sediment-laden water (step 401), calculating net sediment deposition at each map view location using the flow properties of the two-dimensional map view system of equations (step 402), recording the net sediment deposition as it varies with time and spatial location (step 403), and repeating, if necessary, steps 401-403 for each time step until the time duration of the simulation is complete. The individual steps will be described in greater detail in the following paragraphs.

In one embodiment, step 401 involves determining the properties of the turbidity flow by solving a two-dimensional time-dependent map view system of equations, where the flow properties described by the equations comprise flow momentum, flow height, suspended sediment concentration, and entrainment of overlying clear water. This solution process expresses equations [1]-[4] in discrete form where the value of the flow parameters in each cell are updated according to the method specified for the HLL solver [Harten et al. 1983]. To use the HLL solver, equations [1]-[4] are first written in a conservative form, where the primary variables such flow height, flow velocity and the suspended sediment concentration are transformed to a set of conservative variables defined as follows:

$U_1 = u_x h$.

$U_2 = u_y h$.

$U_3 = h$.

$U_{4i} = C_i h$ where $i = 1, 2, \ldots, n$.

Once the values of the these conservative variables are determined, the primary flow variables can be easily calculated using the following equations:

$$u_x = \frac{U_1}{U_3}.$$

$$u_y = \frac{U_2}{U_3}.$$

$h = U_3$.

$$C_i = \frac{U_{4i}}{U_3}$$

where $i = 1, 2, 3, \ldots, n$.

At each time step, the values of the conservative variables $U_1$, $U_2$, $U_3$ and $U_{4i}$ are evaluated for each cell. In the HLL solver, the conservative variables are assumed to be piecewise constant in each cell. The conservative variables are also assumed to be discontinuous across all cell edges that separate two cells, and the discontinuities are treated as shock fronts. The wave speed associated with the propagation of the shock fronts across all the cell faces are then calculated. Once the wave propagation speeds are obtained, fluxes across that cell face are then calculated for each conservative variable. The values of the conservative variables in each cell are then updated, and the new values for the flow parameters in each cell are obtained from these newly updated conservative variables.

Step 402 involves calculating net sediment deposition at the current time step for at least one map view location using the flow properties updated in step 401. The properties of the net sediment deposition that can be calculated include but are not limited to the net deposition rate for each grain size bin, the total thickness of sediment deposited during the time step, the new bottom elevation at the cell, bedding type within the cell (as inferred using flow velocity), and any combination thereof. In one embodiment this step may be performed using equations [18] and [24].

Step 403 involves recording the net sediment deposition at the current time step for at least one map view location. The net sediment deposition, as it varies with time and spatial location, may be updated and recorded in a grid of model cells during the simulation. One gridding method suitable for recording the net sediment deposition at it varies with time and spatial location is described in International Patent Publication No. 60/584,617 WO 2006/007466 (Hydro-Grids).

In an optional additional step, Steps 401 through 403 are repeated for each desired time step until the time duration of the simulation is complete. Furthermore, the simulated sedimentary deposit may be checked against available geologic data such as seismic, outcrop, core, or well log data. If the simulated deposit does not match the geologic data, boundary conditions (including inlet flow properties and initial bottom topography) may be adjusted and the steps repeated in an iterative manner.

A second embodiment will now be described. With reference to FIG. 5, this embodiment is a method for simulating the formation of sedimentary systems. As illustrated in FIG. 5, the topography of the surface underlying the simulation region is determined (step 501), the location of the inlet of the flow that deposited the sediments is determined (step 502), a grid is created dividing the region of simulation into cells (step 503), the flow properties at the inlet are estimated (step 504), a flow simulation is performed by updating the flow properties in each grid cell based on the estimated flow properties at the inlet (step 505), the net sediment deposition in each cell is calculated based on the flow properties (step 506), the net sediment deposition for each cell is recorded (step 507), steps 505-507 are repeated until a stopping criterion is achieved (step 508). The individual steps will be described in greater detail in the following paragraphs.

Step 501 involves determining the topography of the surface underlying the simulation region. In one embodiment this is typically accomplished by identifying a stratigraphic surface in a three-dimensional seismic data volume. This can be accomplished by methods familiar to persons of ordinary skill in the art, who will also recognize other methods for identifying or inferring the geometry of a stratigraphic surface. Such other methods include, but are not limited to interpretation of two-dimensional seismic lines, other remote imaging techniques, correlating well logs, and spatially correlating outcrop observations.

Step 502 involves determining the location of the inlet of the flow that deposited the sediments above the bottom surface. This is typically accomplished based on the interpreted paleoflow direction determined by a seismic interpreter according to methods familiar to persons of ordinary skill in the art.

Step 503. A grid is created by dividing the region of simulation into cells. The preferred embodiment of the gridding method is described in International Patent Publication No. WO 2006/007466.

Step 504. The inlet properties are estimated. The inlet properties characterized in this step comprise the flow velocity, the flow height, the volume fraction of the flow composed of grains within each grain-size range, and the inlet width. Optionally, corrections to the bottom surface can be estimated at this step as well. Such corrections could include overall slope adjustments to the surface to restore the paleoslope at the time of deposition.

In U.S. Pat. No. 6,885,941, assumptions are made about relationships between the inlet flow properties. In one embodiment, flow velocity becomes the only independent variable in defining the local inlet properties. Thus, in that embodiment, characterizing the inlet properties can be accomplished by simply estimating the inlet flow velocity.

Step 505 involves simulating deposition by updating the flow properties in each grid cell based on the estimated flow properties at the inlet. Equations [1]-[4] are written in discrete form. Therefore, at each time step the flow parameter values in each cell are updated according to the method specified for the HLL solver as described previously [Harten et al., 1983]

Step 506 involves calculating the net sediment deposition for each cell from the flow parameters. Typically equations [18] and [24] are used to calculate the net sediment deposition for each cell from the flow parameters.

Step 507 involves recording the net sediment deposition for each cell. The record of net sediment deposition is updated within the gridding method used for the simulation, typically using the Hydro-Grids gridding method described in International Patent Publication No. WO 2006/007466. Since the horizontal lines in Hydro-Grids represent time lines, the cell heights are selected automatically to efficiently represent both thick and thin layers. Gridding methods other than Hydro-Grids may be utilized. However, these methods commonly use cells of fixed vertical dimension which inadequately sample very thin features and over-sample large homogeneous features, consuming computer memory and consuming manipulation of large data structures, which is time intensive.

Step 508. Steps 505-507 are repeated until a pre-determined stopping criterion is reached. The stopping criterion is typically either the completion of a specified number of time steps or a specified duration of simulated time. Alternatively, the stopping criterion could be that the simulated deposit exceeds a specified height. Possible pre-determined stopping criteria include but are not limited to total time, thickness of the sediments, gradient of the flow, accommodation volume, and any combination thereof.

When the inlet property values in step 504 are not known with certainty, an iterative process can be used where steps 504-508 are repeated, adjusting the inlet properties with each repetition until at least one additional stratigraphic surface identified in both a three-dimensional seismic data volume and in the simulated deposit are substantially similar. This additional stratigraphic surface can be identified by the techniques described in step 501. The similarity between the stratigraphic surfaces may typically pertain to their similar height above the bottom surface and similar lateral extent.

An additional application of simulated deposits is to provide additional constraints and input for conventional geologic modeling methods. Such conventional methods include geocellular methods using conventional or multi-point geostatistics, object based methods, where the distribution of object shapes and sizes is extracted from the simulation, and spectral component methods where the high frequency information is derived from the simulation. The application of deposits simulated according to the inventive method to the calibration of other geologic modeling techniques is also within the scope of this invention.

An additional application of simulated deposits is in identifying the physical processes associated with creation of a particular feature of interest observed in a natural deposit. This application involves identifying a similar feature in the simulated deposit, and observing the flow properties associated with formation of the similar feature in the simulated deposit.

EXAMPLE

Figure 6:
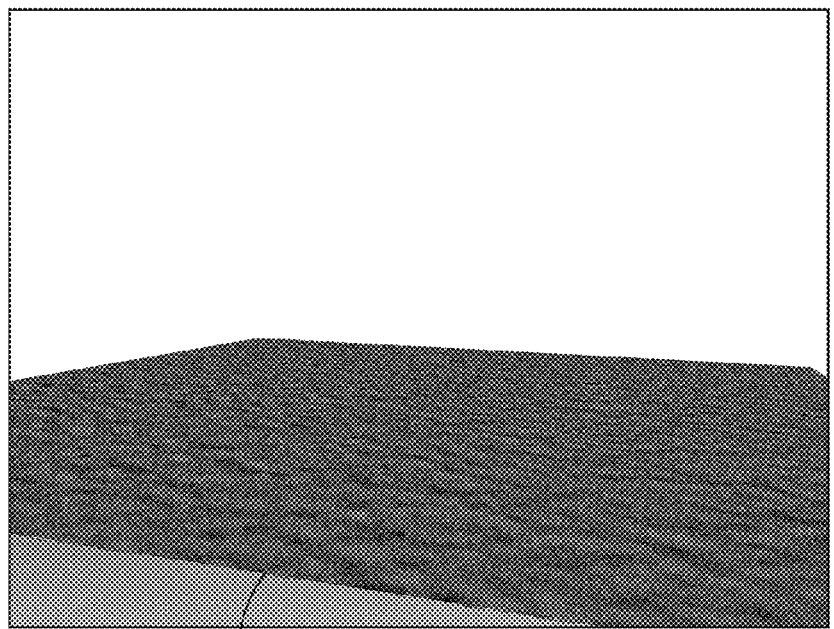
FIG. 6 is a three-dimensional illustration of an initial bottom surface.

A hypothetical example of an embodiment of the inventive method will now be discussed. FIG. 6 shows a three-dimensional initial bottom surface 61 synthesized for this example, as specified in step 501 of FIG. 5. Typically, the initial bottom surface 61 would be an interpreted stratigraphic surface obtained from seismic data. The initial bottom surface could also be obtained from well log data, core data, and/or outcrop studies.

Figure 7:
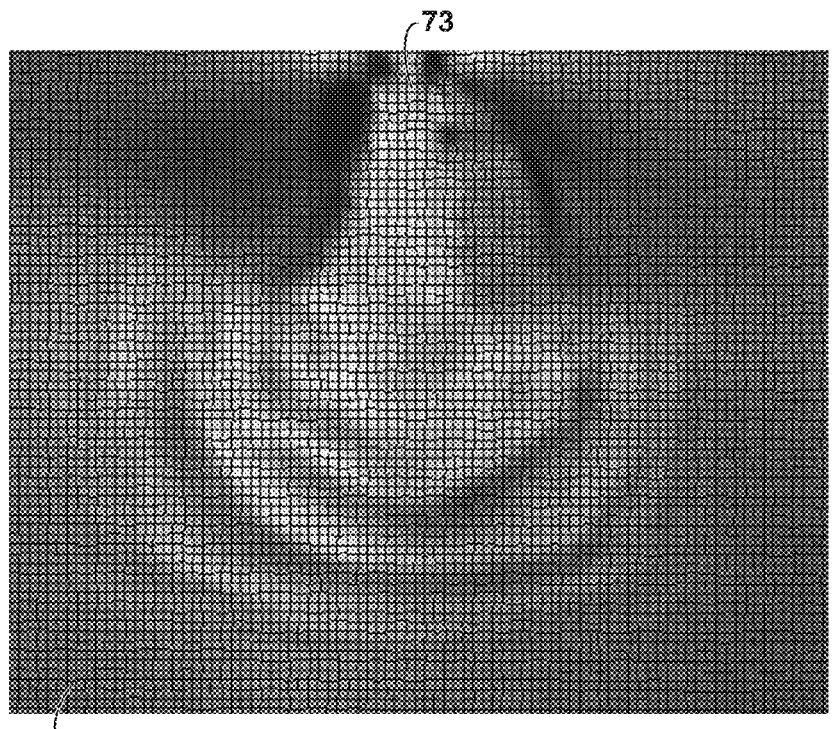
FIG. 7 is a map view of a simulation in progress indicating the individual grid cells and the magnitude of the flow velocity.

After the initial bottom surface is determined, the inlet location is determined (step 502 of FIG. 5), a grid is created (step 503), the inlet properties are estimated (step 504), and the process of repeating steps 505-507 begins. FIG. 7 is a map view of the simulation in progress, specifically showing the magnitude of the flow velocity (grayscale). Lighter shades indicates faster flow velocities and darker shades indicate slower flow velocities. The inlet 73, as chosen in step 502, is at the top center of the figure. The grid 71, as chosen in step 502, are shown superimposed on the image. The grid divides the simulation region into cells so that the model equations can be solved numerically.

Figure 8:
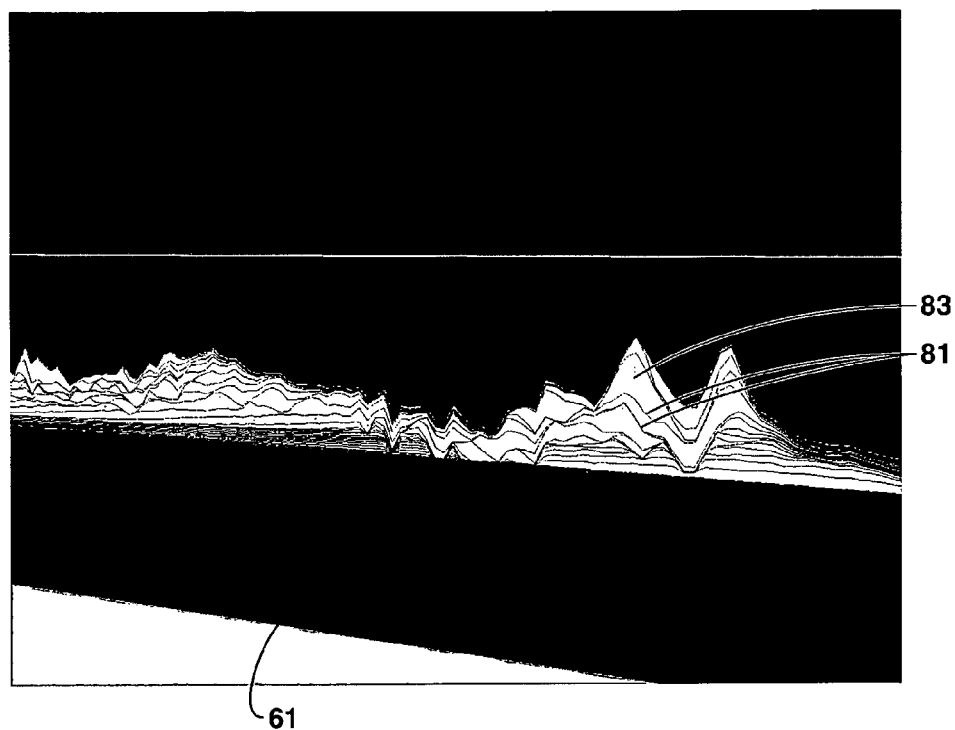
FIG. 8 is a cross-section of a simulated deposit showing bedding and grain-size distribution.

During the simulation, the net sedimentation in each cell is recorded at each time step, as specified in step 507 of FIG. 5. FIG. 8 shows the cross-section of the sedimentation record once the simulation completes. Iso-time lines 81 are shown in black, and the median grain-size is shown in grayscale 83. Optionally, the simulation could be repeated after altering the inlet flow properties and/or initial bottom surface until the final simulated deposit best resembles an actual deposit of interest.

TABLE 1

| Parameter | Numeric Reference In Figures | Definition Of Parameter |
|---|---|---|
| $a_z$ | | Constant, typically $1.3 \times 10^{-7}$. |
| A | | Empirical correction factor, typically 30. |
| B | 8 | Half-width of the inlet. |
| $c_d$ | | Bottom drag coefficient for flow, typically 0.004. |
| C | | Total volume fraction of the sediments in the sediment-laden flow layer. This is the sum of $C_1$ over all grain-size bins. |
| $C_i$ | | Volume fraction of the sediments of the ith grain-size bin in the sediment-laden flow layer. |
| $C_{i0}$ | | Volume fraction of the sediments of the ith grain-size bin in the sediment-laden flow layer at the inlet. |
| $C_{T0}$ | | Total volume fraction of the sediments in the sediment-laden flow layer at the inlet. This is the sum of $C_{i0}$ over all grain-size bins i. |
| $D_{floc}$ | | The grain-size below which the effect of flocculation becomes significant. |
| D | | Grain-size |
| $D_i$ | | Effective grain-diameter of the ith grain-size bin |
| $D_m$ | | Geometric mean grain-size suspended in the flow |
| $D_{pi}$ | | Deposition rate for the ith grain-size bin |
| $D_{10}$ | | Grain-diameter at the 10th percentile. |
| $D_{50}$ | | Grain-diameter at the 50th percentile. |
| $D^*$ | | Effective grain-size. |
| $e_m$ | | Maximum value of the dimensionless erosion rate |
| $E_i$ | | Erosion rate for the ith grain-size bin |
| $F_r$ | | Froude number |
| g | | Gravitational constant, 9.8 m/s² |
| $G_i$ | | Volume fraction of the sediments of the ith grain-size bin in the surface layer of the deposit. Sum of $G_i$ over all i is 1. |
| h | 27 | Height of the sediment-laden flow layer. |
| $h_0$ | 26 | Height of the sediment-laden flow layer at the inlet, constant across the width of the inlet. |
| K | | Turbulent kinetic energy |
| $r_0$ | | Coefficient that relates the depth averaged sediment concentration to the concentration at the bottom |
| R | | Ratio of the density difference between the sediment and water to the density of water |
| $R_i$ | | Richardson number |
| $R_{pi}$ | | Particle Reynolds number. |
| $u_x$ | | x-velocity component of the sediment-laden flow layer. |
| $u_y$ | | y-velocity component of the sediment-laden flow layer. |

TABLE 1-continued

| Parameter | Numeric Reference In Figures | Definition Of Parameter |
|---|---|---|
| $u_0$ | | Velocity of the sediment-laden flow layer at the inlet. The velocity is assumed to be constant laterally across the width of the inlet and vertically through the height of the flow. |
| $v_s$ | | Settling velocity |
| $v_{si}$ | | Settling velocity of grains of diameter $D_i$ in still water |
| $u^*$ | | Shear velocity |
| $w_{hind}$ | | Hindering function |
| X | | Effective grain-size in phi scale |
| $\alpha$ | | Scale Factor |
| $\alpha_k$ | | Another turbulent model parameter. |
| $\alpha_s$ | | Stratification coefficient |
| $\beta_k$ | | Turbulent model parameter. |
| $\gamma$ | | A constant assumed typically to be 2. |
| $\delta_w$ | | The rate of water detrainment per unit area. |
| $\epsilon_w$ | | The rate of water entrainment per unit area. |
| $\zeta$ | | Dimensionless height above bed. |
| $\zeta_0$ | | Model parameter used to adjust the degree of stratification |
| $\eta$ | | Bed elevation |
| $\kappa$ | | Von Karman constant |
| $\lambda$ | | A coefficient related to erosion function defined in equation [27] |
| $\theta_i$ | | A function related to hindered settling defined in equation [21]. |
| $\mu$ | | Mean grain-size measured in phi scale. |
| $\nu$ | | Kinematic viscosity of water. May be assumed to be $10^{-6}$ m²/s. |
| $\nu_t$ | | Turbulent diffusion coefficient. |
| $\xi_c$ | | Vertical profile for sediment concentration. |
| $\rho_w$ | | Water density. |
| $\rho_s$ | | Sediment density. |
| $\sigma$ | | Standard deviation of –sizes measured in phi scale. |
| $\tau_{ci}$ | | Divergence of the concentration due to turbulent diffusion for sediments of grain-size bin i. |
| $\tau_K$ | | Divergence of water mass as part of the turbidity flow due to turbulent diffusion. |
| $\tau_w$ | | Divergence of turbulent energy due to the turbulent diffusion. |
| $\tau_x$ | | Effective shear stress in x direction caused by turbulent diffusion. |
| $\tau_y$ | | Effective shear stress in y direction caused by turbulent diffusion. |
| $\phi$ | | Depositional porosity, typically 0.5 |

BIBLIOGRAPHY

Akiyama, J., and Fukushima, Y., "Entrainment of noncohesive bed sediment into suspension", External Memo. No. 175, St. Anthony Falls Hydraulic Laboratory, University of Minnesota, Minneapolis, USA, 1985.

Bagnold, R. A., "Experiments on a gravity free dispersion of large solid spheres in a Newtonian fluid under shear", Proc. of Royal Soc. London, A225, 49-63, 1954.

Bagnold, R. A., "An approach to the sediment transport problem from general physics", U.S. Geol. Survey Prof. Paper, 422-1, 37 pages, 1966.

Beauboeuf, R. T., and Friedman, S. J., "High resolution seismic/sequence stratigraphic framework for the evolution of Pleistocene intra slope basins, western Gulf of Mexico: depositional models and reservoir analogs: Gulf Coast Section, Society of Economic Paleontologists and Mineralogists, 20th Annual Research Conference, Deep-Water Reservoirs of the World, Dec. 3-6, p 40-60, 2000.

Bradford, S. F., "Numerical modeling of turbidity current hydrodynamics and sedimentation", PhD thesis, Univ. of Michigan, Ann Arbor, Mich., 1996.

Bradford, S. F., and Katopodes, N. D., "Hydrodynamics of Turbid Underflows. I: Formulation and Numerical Analysis", J. Hydr. Eng., 125(10), 1006-1015, 1999.

Bradford, S. F., and Katopodes, N. D., "Hydrodynamics of Turbid Underflows. II: Aggradation, Avulsion, and Channelization", J. Hydraulic Eng. 125, 1016-1028, 1999.

Bradford, S. F., Katopodes, N. D., and Parker, G., "Characteristic analysis of turbid underflows", J. Hydraulic Eng. 123, 420-431, 1997.

Bowman, S. A., and Vail, P. R., "Interpreting the stratigraphy of the Baltimore canyon section, offshore New Jersey with Phil, a stratigraphic simulator", in Numerical Experiments in stratigraphy: Recent advances in stratigraphic and seimentologic computer simulations, Harbaugh, J. W., Watney, W. L., Randey, E. C. Slingerland, R., Goldstein, R. H. and Franseen E. K., SEPM Special Publication, 62, 117-138, 1999.

Bowen, A. J., Normark, W. R., and Piper, D. J. W., "Modeling of turbidity currents on Navy Submarine Fan California, Continental Borderland", Sedimentology, v31, 169-185, 1984.

Dietrich, W. E., "Settling Velocity of Natural Particles", J. Geophys. Res., 18(6), 1615-1626, 1982.

Fukushima, Y., Parker, G., and Pantin, H. M., "Prediction of iginitive turbidity currents in Scripps Submarine Canyon", Mar. Geol., 67, 55-81, 1985.

Garcia, M., and Parker, G., "Entrainment of Bed Sediment into Suspension", J. Hydr. Eng., 117(4), 414-435, 1991.

Granjeon, D., and Joseph, P., "Concepts and applications of a 3-D multiple lithology, diffusive model in stratigraphic modeling",", in Numerical Experiments in stratigraphy: Recent advances in stratigraphic and seimentologic computer simulations, Harbaugh, J. W., Watney, W. L., Randey, E. C. Slingerland, R., Goldstein, R. H. and Franseen E. K., SEPM Special Publication, 62, 197-210, 1999.

Harlow, F. H., "The particle-in-cell computer method for fluid dynamics, in Alder, ed., Computational Physics, vol. 3, Academic Press, New York, 319-343, 1964.

Harten, A., Lax, P., and van Leer, A., "On upstream differencing and Godunov-type scheme for hyperbolic conservation laws", Soc. Indus. Appl. Math. Rev., 25(1), 35-61, 1987.

Hockney, R. W., and Eastwood, J. W., "Computer simulation using particles", McGraw-Hill, New York, 523 pages, 1981.

Imran, J., Parker, G., and Katopodes, N. D. "A Numerical Model of Channel Inception on Submarine Fans", J. Geophys. Res., 103(C1), 1219-1238, 1998.

Kaufman, P., Grotzinger, J. P. and McCormick, D. S., "Depth dependent diffusion algorithm for simulation of sedimentation in shallow marine depositional systems", in Sedimentary modeling: computer simulations and methods for improved parameter definition, Ed. Franseen, E. K., Watney W. L., Kendall, C. G. S. C., and Ross, W., Kansas Geological Survey Bull. 233, 489-508, 1991.

Komar, P. D., "Hydraulic jumps in turbidity currents", Geol. Soc. Amer. Bull. 82, 1477-1488, 1971.

Komar, P. D., "Continuity of turbidity current flow and systematic variations in deep-sea channel morphology", Geol. Soc. Amer. Bull. 84, 3329-3338, 1973.

Komar, P. D., "Computer simulation of turbidity current flow and the study of deep-sea channels and fan sedimentation", in Goldberg, E. D., McCave, I. N., O'Brien, J. J., and Steele, J. H., eds, The Sea, vol. 6, Marine Modeling, New York, Wiley-Interscience, 603-621, 1977.

Mackey, S. D. and Bridge, J. S., "Three dimensional model of alluvial stratigraphy: Theory and application", J. Sedi. Res. B65, 7-31, 1995.

Mulder, T., Syvitski, P. M., and Skene, K. I., "Modeling of erosion and deposition by turbidity currents generated at river mouths", J. of Sedi. Res., 68, 124-137, 1998.

Pantin, H. M., "Interaction between velocity and effective density in turbidity flow: Phase-plane analysis, with criteria for autosuspension.", Mar. Geol. 31, 59-99, 1979.

Parker, G., Fukushima, Y., and Pantin, H. M., "Self-Accelerating Turbidity Currents", J. Fluid Mech., 171, 145-181, 1986.

Patwardhan, V. S., and Tien C., "Sedimentation and liquid fluidization of solid particles of different sizes and densities", Chemical Engineering Science, 40, 1051-1060, 1985.

Piper, D. J. W., and Savoye, B., "Processes of late Quaternary turbidity current flow and deposition on the Var deep-sea fan, north west Mediterranean Sea", Sedimentology, 40, 557-582, 1993.

Ritchie, B. D., Hardy, S., and Gawthorpe, R. L., "Three dimensional numerical modeling of coarse-grained clastic deposition in sedimentary basins", J. Geophysical Res., 104, 17759-17780, 1999.

Ritchie, B. D., Gawthorpe, R. L., and Hardy S., "Three dimensional numerical modeling of deltaic depositional sequences 1: Influence of the rate and magnitude of sea-level change", J. of Sedi. Res., 74, 203-220, 2004a.

Ritchie, B. D., Gawthorpe, R. L., and Hardy S., "Three dimensional numerical modeling of deltaic depositional sequences 1: Influence of local controls", J. of Sedi. Res., 74, 221-238, 2004b.

Roe, P. L., "Approximate Riemann solvers, parameter vectors, and difference schemes", J. Computat. Phys., 43, 357-372, 1981.

Syvitski, J., Pratson, L., and O'Grady D., "Stratigraphic predictions of continental margins for the U.S. Navy",", in Numerical Experiments in stratigraphy: Recent advances in stratigraphic and seimentologic computer simulations, Harbaugh, J. W., Watney, W. L., Randey, E. C. Slingerland, R., Goldstein, R. H. and Franseen E. K., SEPM Special Publication, 62, 219-236, 1999.

Tetzlaff, D. M. and Harbaugh, J. W., "Simulating clastic sedimentation", Van Nostrand Reinhold, New York, 202 pages, 1989.

Toniolo, H., "Debris flow and turbidity current deposition in the deep sea and reservoirs", Ph. D. thesis, University of Minnesota, 233 pages, 2002.

Turner, J. S., "Buoyancy Effects in Fluids", Cambridge University Press, 1973.

Van Wagoner, J., Hoyal, D. C. J. D., Adair, N. L., Sun, T., Beaubouef, R. T., Deffenbaugh, M., Dunn, P. A., Huh, C., and Li, D., "Energy dissipation and the fundamental shape of siliciclastic sedimentary bodies", Search and Discovery Article #40081, 2003.

Webb, E. K., "Simulating the three-dimensional distribution of sediment units in braided-stream deposits", J. Sedi. Res., B64, 219-231, 1994.

We claim:

1. A computer-based method for simulating formation of a sedimentary deposit comprising:

(a) determining properties of a flow which formed a sedimentary deposit by solving a two-dimensional time-dependent map view system of equations for a sediment laden water flow, where the two-dimensional time-dependent map view system of equations relates flow properties including at least flow momentum, flow height, suspended sediment concentration, and entrainment of overlying clear water;

(b) calculating net sediment deposition for at least one location using the flow properties from step (a), wherein the net sediment deposition is calculated as a difference between a deposition rate in still water and a flow velocity-dependent erosion rate, and wherein the deposition rate in still water is determined from a still water particle settling velocity and a total sediment concentration;

(c) recording the net sediment deposition from step (b) as a function of time for the at least one location.

2. The method of claim 1 wherein the two-dimensional time-dependent map view system of equations is derived by assuming that vertical profiles of sediment concentration have similar shape at all locations and by further assuming that the vertical profiles of flow velocity have similar shape at all locations.

3. The method of claim 2 wherein the vertical profiles of sediment concentration is assumed to have a center of mass less than half a flow height.

4. The method of claim 1 wherein the recording of the net sediment deposition from step (c) is made relative to an initial bottom topography, the initial bottom topography is an interpreted surface determined from data selected from one of seismic data, well log data, core data, and any combination thereof.

5. The method of claim 1 wherein the suspended sediment concentration and net sediment deposition is modeled for at least two ranges of grain-diameter.

6. The method of claim 1 wherein the net sediment deposition is calculated using information from a simulation of creation and transport of turbulent kinetic energy.

7. The method of claim 1 wherein at least one flow property is determined using information from a simulation of turbulent diffusion.

8. The method of claim 1 wherein recording the net sediment deposition includes recording properties selected from net deposition rate for each grain-size bin, deposited sediment volume for each grain-size bin, grain-size distribution, bedding surfaces, sediment type, and any combination thereof.

9. A computer-based method for simulating the formation of sedimentary deposits comprising:

(a) determining an initial bottom topography;

(b) determining a location of an inlet supplying a depositing flow above the initial bottom topography;

(c) generating a grid dividing at least a portion of a sedimentary basin into cells;

(d) estimating flow properties at the inlet;

(e) determining properties of a flow forming a sedimentary deposit in at least one grid cell by solving a two-dimensional time-dependent map view system of equations for a current time step wherein the two-dimensional time-dependent map view system of equations relates the flow properties including at least flow momentum, flow height, suspended sediment concentration, and rate of entrainment of overlying clear water;

(f) calculating net sediment deposition within each cell for the current time step using the flow properties from step (e), wherein the net sediment deposition is calculated from a difference between a deposition rate in still water and a flow velocity-dependent erosion rate, and wherein the deposition rate in still water is determined from a still water particle settling velocity and a total sediment concentration;

(g) recording the net sediment deposition within each cell for the current time step; and (h) repeating steps (e)-(g) until a pre-determined stopping criterion is reached.

10. The method of claim 9 wherein the inlet flow properties in step (d) are determined by an iterative process where the inlet flow properties are adjusted and steps (e)-(h) are repeated.

11. The method of claim 10 further comprising iteratively adjusting the bottom topography at step (d).

12. The method of claim 10 wherein the similarity between the simulated and measured deposit is determined by:
identifying at least one surface in the measured deposit above the initial bottom topography;
identifying at least one surface in the simulated deposit corresponding to the at least one surface in the measured deposit; and
comparing the measured and simulated deposits using a criteria selected from one of shape, size, separation between corresponding surfaces of the measured and simulated deposits, and any combination thereof.

13. The method of claim 12 wherein surfaces of the measured deposit are determined from data selected from one of well logs, cores, outcrop studies, seismic data, and any combination thereof.

14. The method of claim 9 further comprising using the net sediment deposition to generate geostatistical parameters of rock properties and further comprising using the geostatistical parameters in geostatistical geologic modeling techniques.

15. The method of claim 9 wherein the net sediment deposition is used to determine shapes and sizes of geologic objects for use in object-based geologic modeling.

16. The method of claim 9 wherein the net sediment deposition is used to interpret processes that formed a geologic feature, the interpretation of the geologic feature comprising:
identifying a feature in the simulated deposit which is similar to the geologic feature;
observing the flow properties associated with the formation of the similar feature in the simulated deposit.

17. The method of claim 9 wherein an HLL solver is used to calculate the flow properties.

18. The method of claim 9 wherein the flow properties further comprise an erosion rate, wherein the erosion rate is applied in each of the cells and is determined by a method selected from one of selection by the user prior to the simulation, automatic selection based on the local flow properties in the cell, and any combination thereof.

19. The method of claim 9 wherein the two-dimensional time-dependent map view system of equations is derived by assuming that vertical profiles of sediment concentration have a similar shape at all locations and by further assuming that the vertical profiles of flow velocity have a similar shape at all locations.

20. The method of claim 9 wherein the vertical profiles of sediment concentration is assumed to have a center of mass less than half a flow height.

21. The method of claim 9 wherein the initial bottom topography is an interpreted surface determined from using one of seismic data, well log data, core data, and a combination thereof.

22. The method of claim 9 wherein the suspended sediment concentration and net sediment deposition is modeled for at least two ranges of grain-diameter.

23. The method of claim 9 wherein the net sediment deposition is calculated using information from simulating creation and transport of turbulent kinetic energy.

24. The method of claim 9 wherein at least one of the flow properties is determined using information from simulation of turbulent diffusion.

25. The method of claim 9 wherein the pre-determined stopping criterion is selected from one of total time, deposit thickness, gradient of flow, accommodation volume, and any combination thereof.

26. The method of claim 9 comprising recording properties of the net sediment deposition, wherein the recorded properties of the net sediment deposition are selected from one of a net deposition rate in each grain-size bin, deposited sediment volume in each grain-size bin, grain-size distribution, bedding surfaces, sediment type, and any combination thereof.

27. The method of claim 9 wherein the flow properties comprise a rate of detrainment that characterizes a reduction of the flow height due to setting of the sediment from the depositing flow.

* * * * *